(12) United States Patent
Konda et al.

(10) Patent No.: US 11,757,930 B2
(45) Date of Patent: *Sep. 12, 2023

(54) COOPERATIVE MITIGATION OF DISTRIBUTED DENIAL OF SERVICE ATTACKS ORIGINATING IN LOCAL NETWORKS

(71) Applicant: McAfee, LLC, San Jose, CA (US)

(72) Inventors: Tirumaleswar Reddy Konda, Bangalore (IN); Harsha R. Joshi, Bangalore (IN); Himanshu Srivastava, Bangalore (IN); Srikanth Nalluri, Bellandur (IN); Dattatraya Kulkarni, Bangalore (IN)

(73) Assignee: McAfee, LLC, San Jose, CA (US)

(*) Notice: Subject to any disclaimer, the term of this patent is extended or adjusted under 35 U.S.C. 154(b) by 167 days.

This patent is subject to a terminal disclaimer.

(21) Appl. No.: 17/360,810

(22) Filed: Jun. 28, 2021

(65) Prior Publication Data

US 2021/0329028 A1 Oct. 21, 2021

Related U.S. Application Data

(63) Continuation of application No. 16/154,473, filed on Oct. 8, 2018, now Pat. No. 11,050,785.

(30) Foreign Application Priority Data

Aug. 25, 2018 (IN) .............................. 201841031876

(51) Int. Cl.
*H04L 29/06* (2006.01)
*H04L 12/24* (2006.01)
(Continued)

(52) U.S. Cl.
CPC .......... *H04L 63/1458* (2013.01); *H04L 41/12* (2013.01); *H04L 41/145* (2013.01);
(Continued)

(58) Field of Classification Search
CPC ............. H04L 63/1458; H04L 63/1416; H04L 63/0263; H04L 41/145; H04L 45/745;
(Continued)

(56) References Cited

U.S. PATENT DOCUMENTS 7,203,963 B1 * 4/2007 Wu ........................ G06F 21/552
                                                  709/224
8,259,571 B1 * 9/2012 Raphel ................ H04L 61/2592
                                                  370/230

(Continued)

OTHER PUBLICATIONS

Reddy, T. et al. "Co-operative DDoS Mitigation draft-reddy-dots-transport-02", dated Feb. 9, 2016, 17 pages.
(Continued)

*Primary Examiner* — Badri Narayanan Champakesan
(74) *Attorney, Agent, or Firm* — HANLEY, FLIGHT & ZIMMERMAN, LLC

(57) ABSTRACT

Example methods, apparatus, systems and articles of manufacture to implement cooperative mitigation of distributed denial of service attacks originating in local networks are disclosed. An example network element disclosed herein is to detect a first distributed denial of service attack associated with first network traffic received by an Internet service provider network, the first network traffic originating from a first device connected to a local network. The disclosed example network element is also to implement a threat signaling client to transmit first information describing the first distributed denial of service attack to a threat signaling server implemented by a local network router of the local network, and receive second information from the threat signaling server of the local network, the second information
(Continued)

to provide a notification when the first network traffic associated with the first distributed denial of service attack has been mitigated.

15 Claims, 9 Drawing Sheets

(51) Int. Cl.
| | | |
|---|---|---|
| *H04L 12/741* | (2013.01) | |
| *H04L 9/40* | (2022.01) | |
| *H04L 41/14* | (2022.01) | |
| *H04L 45/745* | (2022.01) | |
| *H04L 41/12* | (2022.01) | |

(52) U.S. Cl.
CPC ........ *H04L 45/745* (2013.01); *H04L 63/0263* (2013.01); *H04L 63/1416* (2013.01); *H04L 63/20* (2013.01)

(58) Field of Classification Search
CPC ..... H04L 41/12; H04L 63/20; H04L 63/0236; H04L 43/028; H04W 12/1202
USPC .......................................................... 726/23
See application file for complete search history.

(56) References Cited

U.S. PATENT DOCUMENTS

| | | | | |
|---|---|---|---|---|
| 8,819,285 | B1* | 8/2014 | Wilkinson | H04L 61/6009 709/246 |
| 9,654,501 | B1* | 5/2017 | Ast | H04L 63/1416 |
| 9,692,784 | B1* | 6/2017 | Nenov | H04L 63/1416 |
| 10,178,109 | B1* | 1/2019 | Miskovic | H04L 63/1416 |
| 10,516,695 | B1* | 12/2019 | Evans | H04L 63/1425 |
| 11,050,785 | B2 | 6/2021 | Konda et al. | |
| 2002/0199109 | A1* | 12/2002 | Boom | H04L 63/1458 713/188 |
| 2004/0148520 | A1* | 7/2004 | Talpade | H04L 63/0227 726/22 |
| 2005/0111367 | A1* | 5/2005 | Jonathan Chao | H04L 63/1458 370/235 |
| 2012/0072605 | A1* | 3/2012 | Xu | H04L 63/0281 709/229 |
| 2012/0124666 | A1* | 5/2012 | Kim | H04L 63/1458 726/23 |
| 2013/0298184 | A1* | 11/2013 | Ermagan | H04L 63/20 726/1 |
| 2015/0089566 | A1* | 3/2015 | Chesla | H04L 63/101 726/1 |
| 2015/0113629 | A1* | 4/2015 | Park | H04L 63/0227 726/13 |
| 2015/0200960 | A1* | 7/2015 | Dickinson | H04L 63/1458 726/23 |
| 2016/0006749 | A1* | 1/2016 | Cohen | H04L 63/1425 726/23 |
| 2017/0034220 | A1* | 2/2017 | Singaraju | H04L 63/1458 |
| 2017/0366576 | A1* | 12/2017 | Donahue | H04L 63/1425 |
| 2018/0007084 | A1 | 1/2018 | Reddy et al. | |
| 2018/0091548 | A1* | 3/2018 | Jain | H04L 63/20 |
| 2018/0091549 | A1* | 3/2018 | Akcin | H04L 63/1408 |
| 2018/0255095 | A1* | 9/2018 | Doron | H04L 63/101 |
| 2019/0036869 | A1* | 1/2019 | Jana | H04L 41/5025 |
| 2019/0068626 | A1* | 2/2019 | Compton | H04L 63/1416 |
| 2019/0140958 | A1* | 5/2019 | Hasani | H04L 47/24 |
| 2020/0067974 | A1 | 2/2020 | Konda et al. | |
| 2020/0104503 | A1* | 4/2020 | Iwasaki | G06F 8/65 |

OTHER PUBLICATIONS

Dobbins, R. et al. "Use cases for DDoS Open Threat Signaling draft-ietf-dots-use-cases-06", dated Jul. 3, 2017, 16 pages.

Reddy, T. et al. "Distributed Denial-of-Service Open Threat Signaling (DOTS) Signal Channel draft-ietf-dots-signal-channel-13", dated Dec. 13, 2017, 77 pages.

European Patent Office "Extended European Search Report" dated Apr. 12, 2022, in related EP Application No. 19854052.8, 13 pages.

Arcsight, "Common Event Format," ArcSight, Inc., Jul. 22, 2010, 18 pages.

Lewis, "DDoS Attacks on SSL: Something Old, Something New," Arbor Networks, Apr. 24, 2012, 7 pages.

Xia et al., "DDoS Open Threat Signaling (dots)," retrieved from https://datatracker.ietf.org/wg/dots/charter/ on Jan. 29, 2019, 3 pages.

"Slowloris: What is Slowloris?" Imperva Incapsula, retrieved from https://www.incapsula.com/ddos/attack-glossary/slowloris.html on Jan. 29, 2019, 4 pages.

"R.U.D.Y. (R-U-DEAD-YET?): What is R U DEAD YET?" Imperva Incapsula, retrieved from https://www.incapsula.com/ddos/attack-glossary/slowloris.html on Jan. 29, 2019, 4 pages.

NCC Group, "NCC Group's DDoS Secure BGP FlowSpec HowTo," NCC, Feb. 19, 2018, 15 pages.

Mortensen et al., "Distributed Denial of Service (DDoS) Open Threat Signaling Requirements," Feb. 8, 2018, 20 pages.

"Mirai (malware)," Wikipedia, retrieved from https://en.wikipedia.org/w/index.php?title=Mirai_(malware)&oldid=877628075 on Jan. 29, 2019, 5 pages.

Nishizuka et al., "IETF Hackathon Report: DOTS Interop," IETF 101 DOTS WG, Mar. 20, 2018, 11 pages.

International Searching Authority, "International Search Report," mailed in connection with International Patent Application No. PCT/US2019/047738, dated Dec. 13, 2019, 3 pages.

International Searching Authority, "Written Opinion," mailed in connection with International Patent Application No. PCT/US2019/047738, dated Dec. 13, 2019, 7 pages.

International Bureau, "International Preliminary Report on Patentability," mailed in connection with International Patent Application No. PCT/US2019/047738, dated Mar. 2, 2021, 8 pages.

United States Patent and Trademark Office, "Notice of Allowance," mailed in connection with U.S. Appl. No. 16/154,473, dated Feb. 24, 2021, 22 pages.

United States Patent and Trademark Office, "Advisory Action," mailed in connection with U.S. Appl. No. 16/154,473, dated Oct. 26, 2020, 3 pages.

United States Patent and Trademark Office, "Final Office Action," mailed in connection with U.S. Appl. No. 16/154,473, dated Aug. 14, 2020, 31 pages.

United States Patent and Trademark Office, "Non-final Office Action," mailed in connection with U.S. Appl. No. 16/154,473, dated Apr. 23, 2020, 26 pages.

* cited by examiner

COOPERATIVE MITIGATION OF DISTRIBUTED DENIAL OF SERVICE ATTACKS ORIGINATING IN LOCAL NETWORKS

RELATED APPLICATION(S)

This patent arises from a continuation of U.S. application Ser. No. 16/154,473 (now U.S. Pat. No. 11/050,785), titled "COOPERATIVE MITIGATION OF DISTRIBUTED DENIAL OF SERVICE ATTACKS ORIGINATING IN LOCAL NETWORKS," and filed on Oct. 8, 2018. Priority to U.S. application Ser. No. 16/154,473 is claimed. U.S. application Ser. No. 16/154,473 is hereby incorporated herein by reference in its entirety.

FIELD OF THE DISCLOSURE

This disclosure relates generally to data networks and, more particularly, to cooperative mitigation of distributed denial of service attacks originating in local networks.

BACKGROUND

Internet of things (IoT) devices are becoming increasingly prevalent in local networks, such as home networks. However, to maintain affordability, many IoT devices have limited computing resources with minimal, if any, malware protection. Also, the malware protection mechanisms, if any, implemented by IoT devices may be difficult to upgrade and, thus, unable to adapt to evolving types of malware. Thus, an IoT device can be a point of vulnerability for malware attacks. For example, IoT devices connected to a home network can be infected with bots for launching distributed denial of service attacks against public servers and/or other targeted computing resources.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
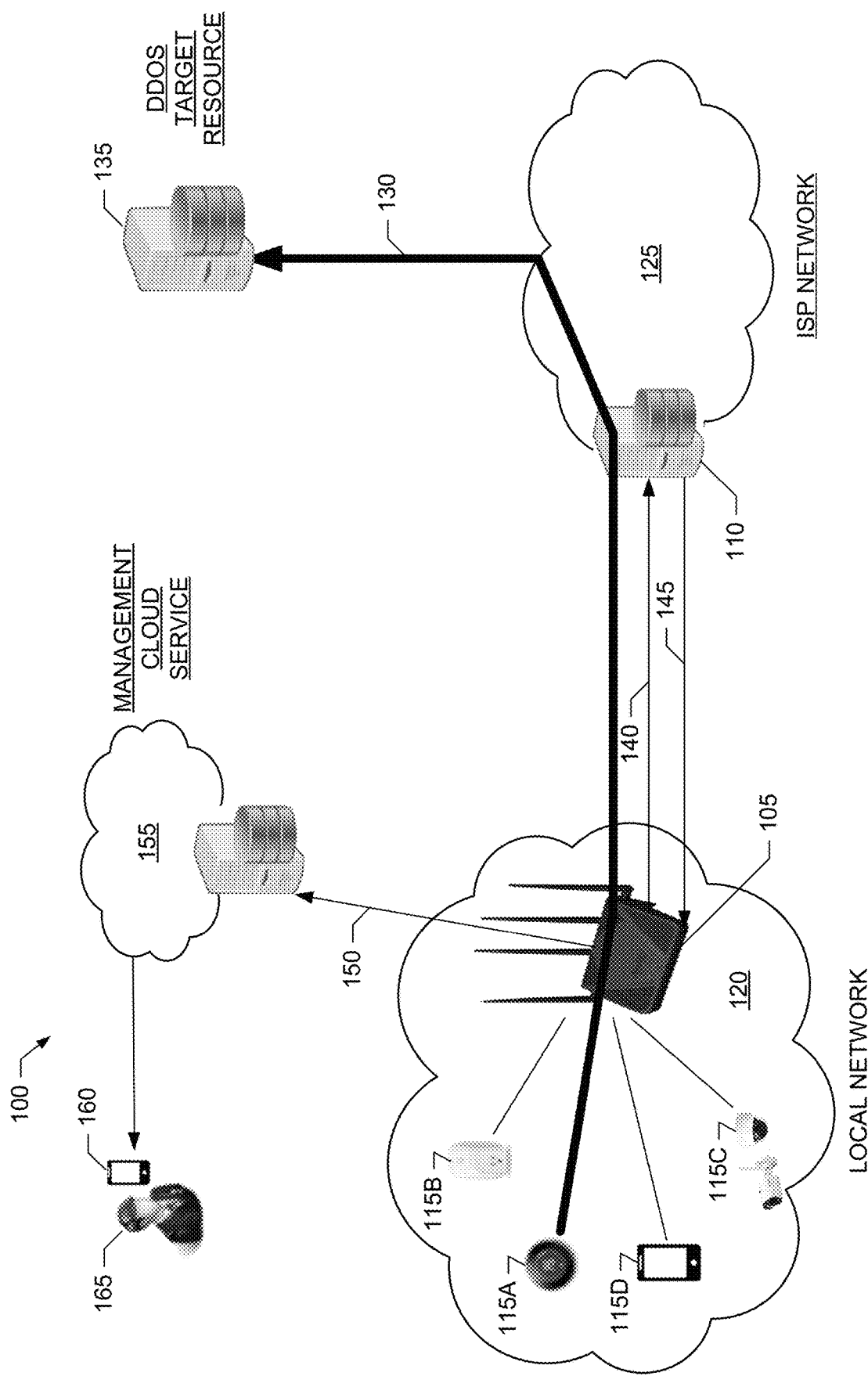
FIG. 1 is a block diagram of an example computing environment including an example local network router and an example service provider network element implemented in accordance with teachings of this disclosure to perform cooperative mitigation of distributed denial of service attacks originating in an example local network.

Example methods, apparatus, systems and articles of manufacture (e.g., physical storage media) to implement cooperative mitigation of distributed denial of service attacks originating in local networks are disclosed. An example local network router disclosed herein to perform cooperative mitigation of distributed denial of service attacks originating in a local network includes an example mitigator to mitigate a first distributed denial of service attack detected by an Internet service provider. For example, the first distributed denial of service attack is associated with network traffic originating from a first device connected to the local network. The example local network router also includes an example threat signaling server to identify the first device based on first information received from a threat signaling client of the Internet service provider, with the first information describing the first distributed denial of service attack. The example threat signaling server of the example local network router is also to transmit second information to notify the threat signaling client of the Internet service provider when the network traffic associated with the first distributed denial of service attack has been mitigated.

In some disclosed examples, to mitigate the first distributed denial of service attack, the example mitigator is to perform deep packet inspection of the network traffic originating from the first device to confirm whether the network traffic is associated with the first distributed denial of service attack, with the deep packet inspection being based on attack characteristics included in the first information. The example mitigator is also to block the network traffic originating from the first device in response to the network traffic being confirmed by the deep packet inspection as being associated with the first distributed denial of service attack.

In some disclosed examples, to mitigate the first distributed denial of service attack, the example mitigator is to transmit a request to an administrative client for authorization to block the network traffic originating from the first device. The example mitigator is then to block the network traffic originating from the first device in response to receiving an authorization response from the administrative client.

In some disclosed examples, the local network router further includes memory to store an address mapping table to map private network addresses of devices connected to the local network to respective public network address associated with the devices. In some such examples, the first information received from the threat signaling client of the Internet service provider identifies a first public network address from which the network traffic associated with the first distributed denial of service attack originates. In some such examples, to identify the first device, the example threat signaling server of the example local network router is to access the address mapping table to identify, based on the first public network address and an attack start time included in the first information, a first private network address of the first device.

In some disclosed examples, the threat signaling client of the Internet service provider is a first threat signaling client, and the example threat signaling server of the example local network router is further to emulate a second threat signaling client that is to transmit a request to the first threat signaling client of the Internet service provider to establish a secure connection. In some such examples, after the request is transmitted, the example threat signaling server of the example local network router is to accept incoming messages conveying information describing distributed denial of service attacks when the incoming messages are received from the first threat signaling client of the Internet service provider. However, the example threat signaling server of the example local network router is to block incoming messages conveying information describing distributed denial of service attacks when the incoming messages are not received from the first threat signaling client of the Internet service provider. Furthermore, in some disclosed examples, the example threat signaling server of the example local network router is a first threat signaling server, the first threat signaling client of the Internet service provider is to emulate a second threat signaling server, and the request is to cause the first threat signaling client of the Internet service provider to switch from emulating the second threat signaling server to operating as the first threat signaling client relative to the first threat signaling server.

In some disclosed examples, the example threat signaling server of the example local network router is further to report third information to a cloud service, the third information describing the first device and the first distributed denial of service attack.

An example network element disclosed herein to perform cooperative mitigation of distributed denial of service attacks associated with network traffic received by an Internet service provider network includes an example detector to detect a first distributed denial of service attack associated with first network traffic received by the Internet service provider network. For example, the first network traffic originates from a first device connected to a local network. The example network element also includes an example threat signaling client to transmit first information describing the first distributed denial of service attack to a threat signaling server implemented by a local network router of the local network. The example threat signaling client of the example network element is also to receive second information from the threat signaling server of the local network. For example, the second information is to provide a notification when the first network traffic associated with the first distributed denial of service attack has been mitigated.

In some disclosed examples, the example detector of the example network element is to detect the first distributed denial of service attack based on at least one of filtering rules provided by an upstream service provider or a distributed denial of service detection algorithm implemented by the detector.

In some disclosed examples, the first information transmitted by the example threat signaling client of the example network element includes a tuple to specify: a source Internet protocol address associated with the first distributed denial of service attack, a destination Internet protocol address associated with the first distributed denial of service attack, a source port associated with the first distributed denial of service attack, a destination port associated with the first distributed denial of service attack, and a protocol type of the network traffic is associated with the first distributed denial of service attack. In some such disclosed examples, the first information transmitted by the example threat signaling client of the example network element further includes attack characteristics associated with the first distributed denial of service attack. Examples of such attack characteristics include, but are not limited to, an attack start time, an attack type, an identifier of a resource under attack, a traffic volume associated with the attack, etc.

In some disclosed examples, the threat signaling server of the local network is a first threat signaling server, and the example threat signaling client of the network element is further to emulate a second threat signaling server that is to receive a request from the first threat signaling server of the local network to establish a secure connection. In some such examples, the example threat signaling client of the network element is to switch from emulating the second threat signaling server to operating as the threat signaling client, after receipt of the request, to transmit messages to the first threat signaling server of the local network conveying information describing distributed denial of service attacks and to receive corresponding notifications from the first threat signaling server of the local network concerning the distributed denial of service attacks. Furthermore, in some such disclosed examples, the example threat signaling client of the example network element is a first threat signaling client, the first threat signaling server of the local network is to emulate a second threat signaling client, and after the request is received, the first threat signaling server of the local network is to switch from emulating the second threat signaling client to operating as the first threat signaling server relative to the first threat signaling client.

These and other example methods, apparatus, systems and articles of manufacture (e.g., physical storage media) to implement cooperative mitigation of distributed denial of service attacks originating in local networks are disclosed in further detail below.

As noted above, IoT devices are becoming increasingly prevalent in local networks, such as home networks. However, because it may have limited malware protection, an IoT device can be a point of vulnerability for malware attacks. For example, an IoT device connected to a home network can be infected with a bot for launching a distributed denial of service attack (DDoS) against one or more public servers and/or other targeted computing resources.

Several techniques have been developed to detect and mitigate DDoS attacks. However, such prior DDoS mitigation techniques are typically implemented in a service provider network, such as an Internet service provider (ISP) network, rather than in the local networks. This is because the local routers (e.g., home routers) of the local networks (e.g., home networks) often have insufficient computing resources to implement the prior DDoS mitigation techniques. For example, some DDoS mitigation techniques rely on deep packet inspection to detect packet flows associated with a DDoS attack. However, due to memory and processor limitations, a local router may limit deep packet inspection to just a few initial packets of a flow that are routed over a slow path implemented by the router (e.g., in the router kernel), whereas the following majority of packets of the flow are routed without deep packet inspection over a fast path implemented by the router. Such limited deep packet inspection may be insufficient for the local router to detect and mitigate network traffic associated with a DDoS attack originating in the local network.

Service provider networks can include network elements having sufficient memory and computing resources to perform deep packet inspection to a degree sufficient to perform DDoS mitigation. Furthermore, a service provider network may receive filtering rules from upstream providers that define how detected DDoS network traffic is to be mitigated. For example, such filtering rules may specify whether detected DDoS network traffic is to be blocked, rate-limited, etc. However, the DDoS mitigation implemented by the service provider is typically limited to blocking or rate-limiting all traffic originating from a local network associated with a detected DDoS attack. This is because the service provider may be unable to identify which infected device in a local network, such as a local network using Internet Protocol (IP) version 4 (IPv4) addressing, is responsible for transmitting the DDoS network traffic due to network address translation implemented by the local router. Network address translation allows the local router to hide the private network addresses of devices connected to the local network by replacing such private network addresses with the public network address of the local router, or a range of public network addresses assigned to the router. Even in more modern local network using IPv6 addressing, which allows the service provider to identify a device connected to the local network, the service provider still may be unable to identify an infected device in the local network because the infected device may be configured by malware to change its network address to evade the service provider's attempts to block the infected network traffic.

Example methods, apparatus, systems and articles of manufacture (e.g., physical storage media) disclosed herein to implement cooperative mitigation of DDoS attacks originating in local networks provide technical solutions to such technical problems associated with prior DDoS mitigation techniques. For example, disclosed technical solutions for DDoS mitigation provide mechanisms for network elements of service provider networks to cooperate with local routers of local networks to mitigate DDoS traffic originating in the local networks. In some disclosed examples, a network element of a service provider network detects a DDoS attack originating from a local network and conveys information describing details of the DDoS attack to a local router of the local network. The local router, in turn, uses the DDoS attack details provided by the service provider network to identify the infected device connected to the local network and mitigate the DDoS network traffic originating from the infected device. For example, the local router may block the DDoS network traffic originating from the infected device, quarantine the infected device by blocking all traffic originating from the infected device, etc. In this way, disclosed technical solutions can target DDoS mitigation at the particular infected device, rather than blocking or rate-limiting all network traffic originating from the entire local network.

In some disclosed examples, the local router notifies an administrative client executing on another computing device (e.g., such as an administrative application executing on a mobile phone) of details concerning the detected DDoS attack, which may allow a network administrator to take further action concerning the infected device. In some examples, the local router notifies a cloud service (e.g., such as a router management service) of details concerning the detected DDoS attack. In such examples, the cloud service may cascade the DDoS attack details to other local routers associated with other local networks to allow such local routers to take preventative action to avoid further DDoS attacks originating from similar devices.

Turning to the figures, a block diagram of an example computing environment 100 including an example local network router 105 and an example service provider network element 110 implemented in accordance with teachings of this disclosure to perform cooperative mitigation of distributed denial of service attacks originating in an example local network is illustrated in FIG. 1. In the illustrated example of FIG. 1, the local network router 105 provides example devices 115A-D connected to, or otherwise in communication with, an example local network 120 with access to an example service provider network 125. For example, the local network 120 can be a cabled local area network (LAN), a wireless LAN (WLAN) such as a WiFi® network, etc., a powerline network, or any combination thereof implementing a home network, a business network, etc. The example service provider network 125 can be any type of service provider network, such as an Internet service provider network (ISP), a cellular service provider network, a satellite service provider network, etc. As such, the example local network router 105 can correspond to any type of router or other network access point, such as a WiFi® router, a Mobile over Coax Alliance (MoCA)® router and/or any other home network router, etc., capable of interfacing such an example local network 120 with such an example service provider network 125. The example network element 110 can correspond to any network element involved in routing network traffic in the service provider network 125. For example, the network element 110 can correspond to an edge router, a border router, a base station, etc.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The example devices 115A-D connected to the example local network 120 can include any number and/or type(s) of computing devices, which may include, but are not limited to, one or more IoT devices. In the illustrated example of FIG. 1, the devices 115A-D include example IoT devices, such as, but not limited to, an example smart thermostat 115A, an example smart power outlet 115B and an example surveillance camera 115C. The devices 115A-D of the illustrated example include other computing devices, such as, but not limited to, an example smartphone 115D.

In the illustrated example of FIG. 1, the local router 105 and the network element 110 are structured in accordance with teachings of this disclosure to implement a mechanism to perform cooperative mitigation of DDoS attacks originating in the local network 120. For example, consider a scenario as shown in FIG. 1 in which the smart thermostat 115A is infected or otherwise compromised by a bot or other malware that causes the smart thermostat 115A to originate an example DDoS attack 130 targeting an example target computing resource 135. The target computing resource 135 can be any targeted computing resource (e.g., server, application, service, etc.) accessible from the local network 120 via the service provider network 125. Examples of DDoS attacks 130 that could be originated by the infected smart thermostat 115A include, but are not limited to, application layer (or layer 7) DDoS attacks, transport layer security (TLS) DDoS attacks, network layer DDoS attacks, etc. Application layer DDoS attacks can include hypertext transfer protocol (HTTP) floods, sending garbage data or partial HTTP requests, zero-day assaults, and other attacks based on seemingly legitimate network traffic (e.g., requests) but having a magnitude (e.g., in requests per second) intended to overwhelm the target computing resource. TLS DDoS attacks can include continuous repetition of TLS renegotiation until the available resources of the target computing resource 135 are exhausted. Network layer DDoS attacks can include user datagram protocol (UDP) floods, synchronize message (SYN) floods, network time protocol (NTP) floods, domain name server (DNS) amplification, simple service discovery protocol (SSDP) amplification, IP fragmentation, etc., having a magnitude (e.g., in bits per second, packets per second, etc.) intended to exhaust the bandwidth/capacity of the communication link to the target computing resource 135.

The cooperative DDoS mechanism implemented by the local router 105 and the network element 110 of the illustrated example begins with the local router 105 establishing a secure connection with the network element 110 (represented by line 140 in FIG. 1) to enable the local router 105 to receive information from the network element 110 concerning DDoS attacks detected by the service provider (e.g., ISP) as originating from the local network 120. After the secure connection is established, the local router 105 is able to receive information from the network element 110 (represented by line 145 in FIG. 1) describing details of a DDoS attack, such as the DDoS attack 130, originating in the local network 120 and detected by the service provider (e.g., ISP). The DDoS attack information sent by network element 110 to the local router 105 can include a data tuple specifying source and/or destination address details, source and/or destination port details, protocol type details, etc., or any combination thereof associated with the detected DDoS attack. The DDoS attack information sent by network element 110 to the local router 105 additionally or alternatively include other details concerning characteristics of the DDoS attack, such as a type of the DDoS attack, whether the DDoS attack was detected via DDoS detection mechanism (e.g., implemented by the network element 110) or via one or more filtering rules received from an upstream service provider, etc. The local router 105 of the illustrated examples uses the received DDoS attack information to identify the infected device (e.g., the device 115A in the illustrated example) originating the detected DDoS attack (e.g., the DDoS attack 130 in the illustrated example) and mitigate the DDoS network traffic originating from the infected device. For example, the local router 105 may block the particular network traffic originating from the infected device 115A that is associated with the detected DDoS attack 130, or may quarantine the infected device 115A by blocking all network traffic originating from the infected device 115A.

In some examples, the local router 105 sends one or more notifications 150 to an example router management cloud service 155 conveying details concerning the detected DDoS attack 130. For example, the local router 105 may send a notification 150 to notify an example administrative client 160 executing on another computing device (e.g., such as an administrative application executing on a mobile phone) of details concerning the detected DDoS attack, which may allow an example network administrator 165 of the local network 120 to take further action concerning the infected device 115A. Additionally or alternatively, in some examples, the local router 105 may send a notification 150 to allow the cloud service 155 to cascade the details concerning the detected DDoS attack 130 to other local routers managed by the cloud service 155 and associated with other local networks to allow such local routers to take preventative action to avoid further, similar DDoS attacks originating from similar devices connected to those local networks.

Figure 2:
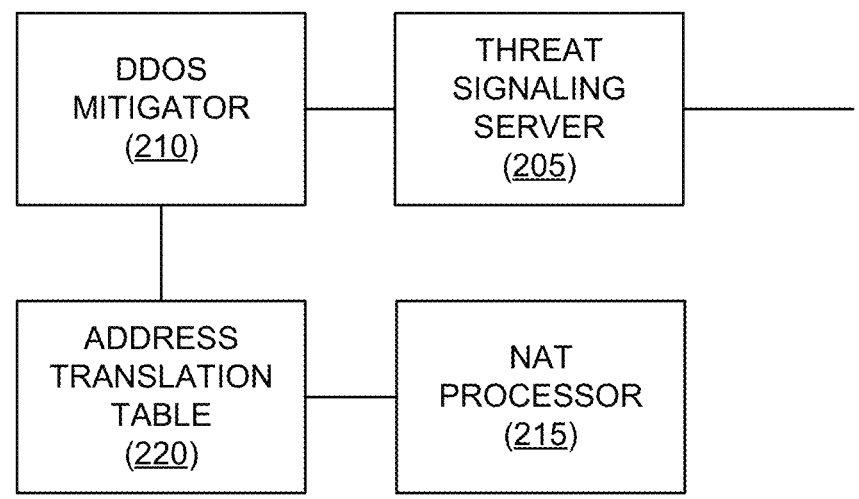
FIG. 2 is a block diagram of an example implementation of the local network router of FIG. 1.
Figure 3:
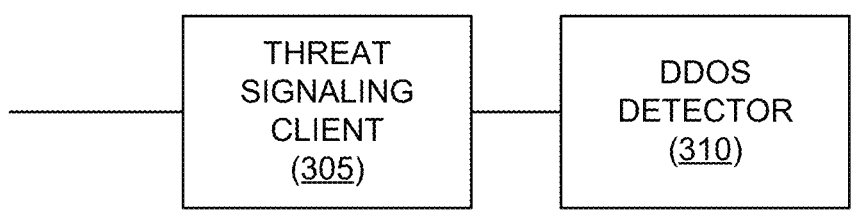
FIG. 3 is a block diagram of an example implementation of the service provider network element of FIG. 1.

A more detailed block diagram of the example local router 105 of FIG. 1 is illustrated in FIG. 2. In the illustrated example of FIG. 2, aspects of the local router 105 related to implementing cooperative mitigation of DDoS attacks originating in the example local network 120 are shown, whereas other aspects are omitted for clarity. The example local router 105 of FIG. 2 includes an example threat signaling server 205, an example DDoS mitigator 210, and example network address translation (NAT) processor 215 and an example address translation table 220. A more detailed block diagram of the example service provider network element 110 of FIG. 1 is illustrated in FIG. 3. In the illustrated example of FIG. 3, aspects of the network element 110 related to implementing cooperative mitigation of DDoS attacks originating in the example local network 120 are shown, whereas other aspects are omitted for clarity. The example network element 110 of FIG. 3 includes an example threat signaling client 305 and an example DDoS detector 310.

In the illustrated examples of FIGS. 2 and 3, the threat signaling server 205 of the local router 105 is to establish a secure connection with the threat signaling client 305 of the network element 110 via which the local router 105 is to receive information describing a DDoS attack (e.g., the DDoS attack 130) originating from the local network 120 that is detected by the service provider (e.g., by the example DDoS detector 310 of the network element 110, as described in further detail below). After the secure connection is established, the threat signaling server 205 of the local router 105 accepts incoming messages conveying information describing DDoS attacks when the incoming messages are received from the threat signaling client 305 of the network element 110. However, the threat signaling server 205 of the local router 105 blocks incoming messages conveying information describing DDoS attacks when the incoming messages are not received from the threat signaling client 305 of the network element 110 (e.g., to prevent DDoS attacks against the local router 105, spoofing attacks against the local router 105 and/or other attempts to infect the local router 105).

In the illustrated examples of FIGS. 2 and 3, the DDoS detector 310 of the network element 110 evaluates the network traffic received from the local network 120 via the local router 105 to detect a DDoS attack (e.g., the DDoS attack 130) originating in the local network 120. For example, the DDoS detector 310 can analyze the network traffic originating from the local network 120 using deep packet inspection and/or one or more other DDoS detection algorithms to detect network traffic indicative of a DDoS attack. Additionally or alternatively, the DDoS detector 310 can evaluate characteristics of the network traffic originating from the local network 120 using filtering rules provided by an upstream service provider to detect network traffic indicative of a DDoS attack.

In the illustrated examples of FIGS. 2 and 3, in response to the DDoS detector 310 of the network element 110 detecting a DDoS attack (e.g., the DDoS attack 130) originating in the local network 120, the threat signaling client 305 of the network element 110 transmits information describing the detected DDoS attack to the threat signaling server 205 of the local router 105. The threat signaling server 205 of the local router 105 receives the information describing the detected DDoS attack from the threat signaling client 305 of the network element 110 and uses the information to identify the infected device (e.g., the device 115A) connected to the local network 120 that is responsible for originating the network traffic associated with the detected DDoS attack (e.g., the DDoS attack 130).

For example, the threat signaling server 205 of the local router 105 may use DDoS attack details provided in the information received from the threat signaling client 305 of the network element 110 to access the address translation table 220 to determine a private network address associated with the infected device (e.g., the device 115A). In some examples in which the local router 105 employs NAT, the NAT processor 215 of the local router 105 maps the private network addresses of the devices 115A-D connected to the local network 120 to corresponding public network addresses associated with the devices 115A-D. The private network addresses of the devices 115A-D are used within the local network 120 but are kept hidden from external networks, such as the provider network 125. The public network addresses of the devices 115A-D are made known to external networks, such as the provider network 125, to allow external devices to reach the devices 115A-D connected to the local network. In such examples, the NAT processor 215 of the local router 105 stores the mappings of private network addresses to public network addresses for the devices 115A-D in the address translation table 220. In some such examples, DDoS attack details received from the threat signaling client 305 of the network element 110 identify a public network address from which the network traffic associated with the DDoS attack originates and an attack start time, which the threat signaling server 205 of the local router 105 uses to access the address translation table 220 to identify the private network address of the infected device (e.g., the device 115A) from which the network traffic associated with the DDoS attack originates.

In the illustrated examples of FIGS. 2 and 3, the DDoS mitigator 210 of the local router 105 mitigates the detected DDoS attack described in the information received from by the threat signaling server 205 from the threat signaling client 305 of the network element 110. In some examples, the DDoS mitigator 210 mitigates the detected DDoS attack by perform deep packet inspection of the network traffic originating from the identified infected device (e.g., device 115A) to confirm whether the network traffic is associated with the detected DDoS attack. If the infected device (e.g., device 115A) is confirmed to be the originator of the detected DDoS attack, the DDoS mitigator 210 blocks the network traffic originating from the infected device (e.g., device 115A). For example, the DDoS mitigator 210 may block just the network traffic associated with the detected DDoS attack, or may block all network traffic originating from the infected device (e.g., device 115A).

In some examples in which the local router 105 does not have the ability to perform deep packet inspection to a level sufficient to confirm the detected DDoS attack, the DDoS mitigator 210 mitigates the detected DDoS attack by transmitting a request to the administrative client 160 (e.g., via the cloud service 155) for authorization to block the network traffic originating from the identified infected device (e.g., device 115A). In such examples, the DDoS mitigator 210 blocks the network traffic originating from the infected device (e.g., device 115A) in response to receiving an authorization response from the administrative client 160 (e.g., via the cloud service 155).

In the illustrated examples of FIGS. 2 and 3, the threat signaling server 205 of the local router 105 may also report information to the cloud service 155 describing details concerning the detected DDoS attack. For example, the threat signaling server 205 may report details concerning the identified infected device (e.g., the device 115A), the type of DDoS attack, the target computing resource 135 targeted by the DDoS attack, etc. Such reported information may be used by the cloud service 155 to preemptively mitigate other DDoS attacks associated with other devices similar to the infected device. For example, the cloud service may disseminate details for the detected DDoS attack to other local router managed by the cloud service 155 to cause those other local routers to, for example, (i) determine whether other devices similar to the infected device are connected to their respective local networks; (ii) inspect the network traffic associated with such similar devices to identify suspicious network traffic associated with a similar DDoS attack; (iii) block the suspicious network traffic; (iv) notify respective administrators of those respective local networks of potential infected devices; etc.

Figure 4:
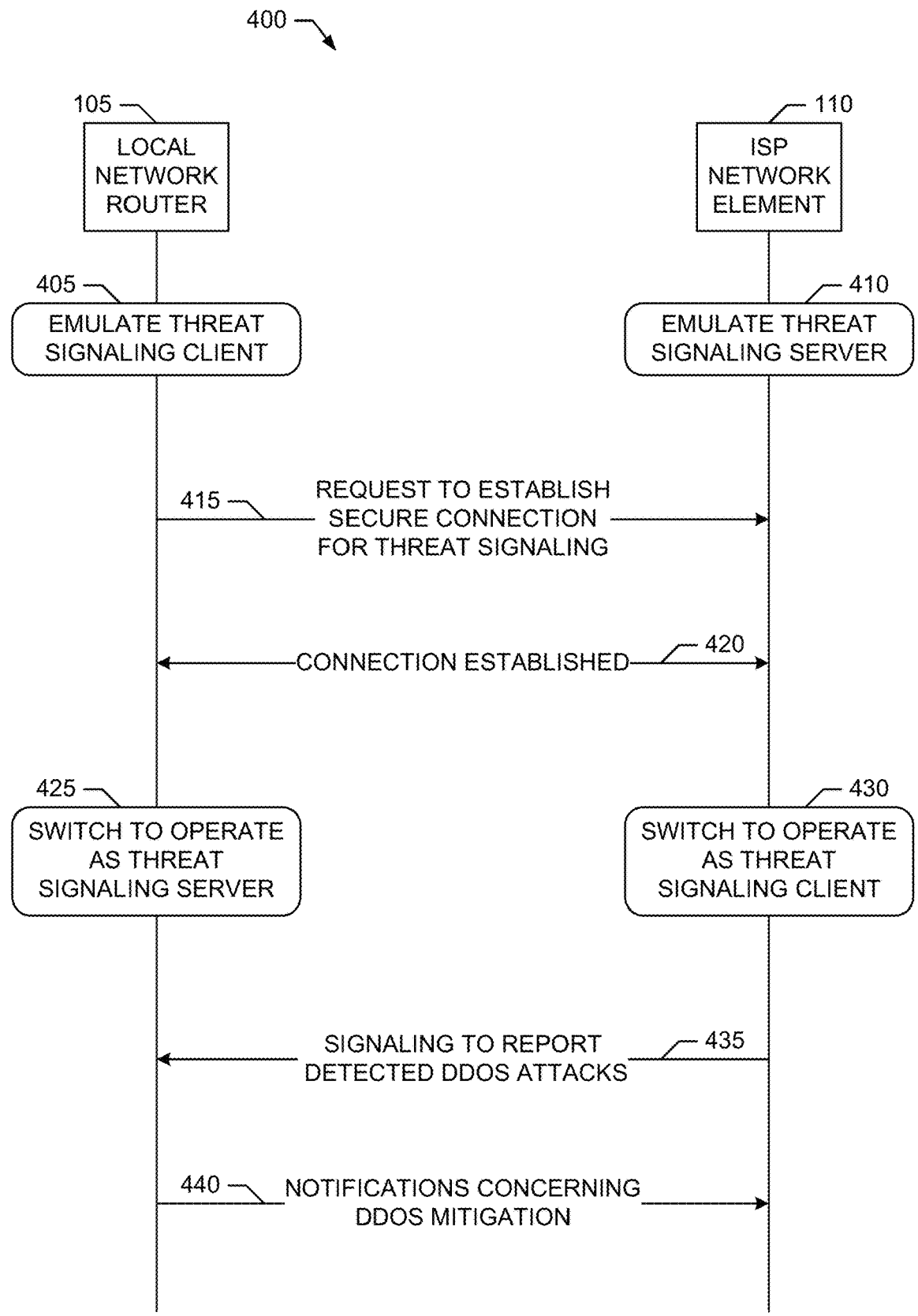
FIG. 4 is a message sequence diagram illustrating an example sequence of operations performed by the example local network router and the example service provider network element to establish a secure connection for exchanging messaging concerning distributed denial of service attacks.
Figure 5:
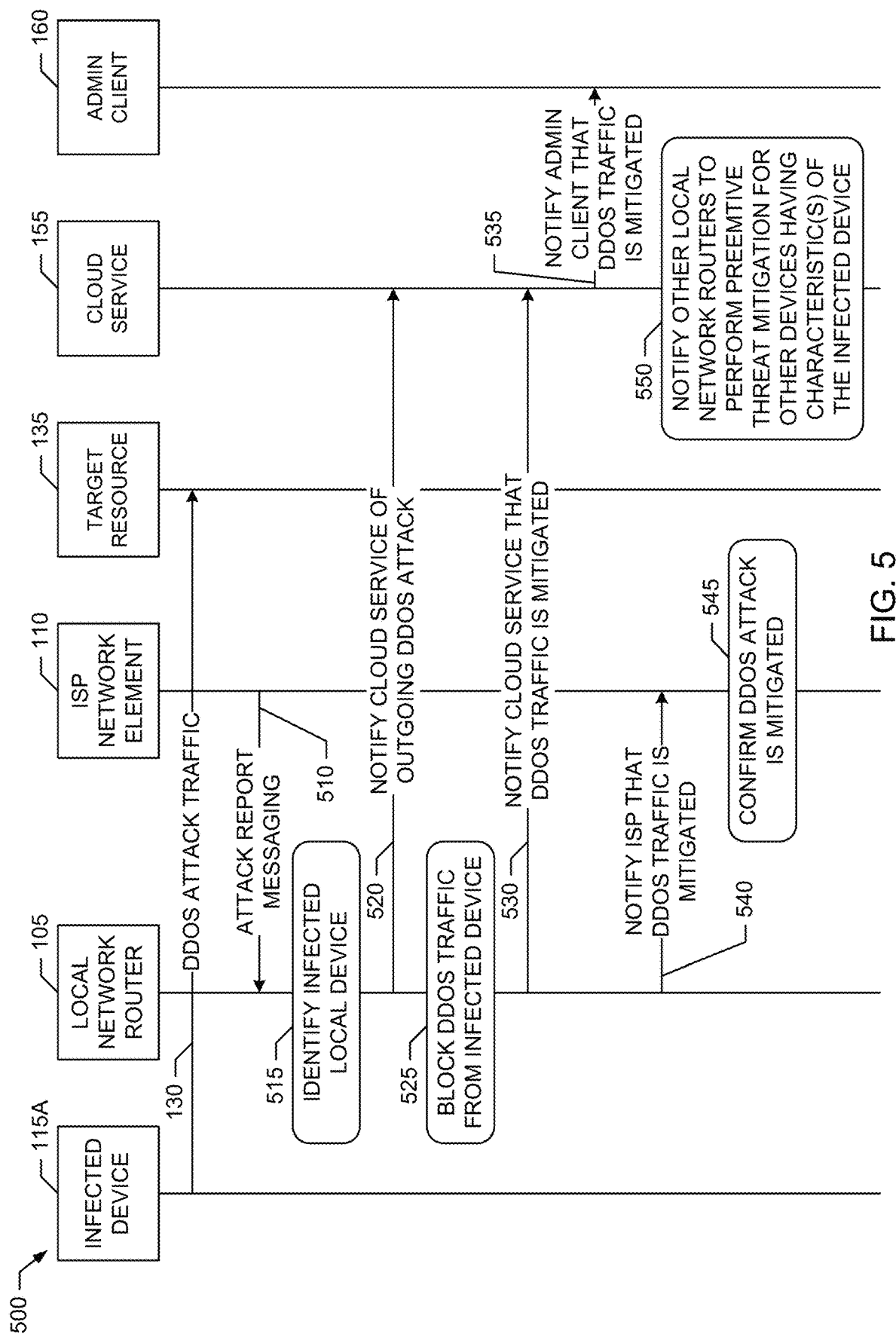
FIG. 5 is a message sequence diagram illustrating a first example sequence of operations performed by the example local network router and the example service provider network element of FIG. 1 to perform cooperative mitigation of a distributed denial of service attack originating in the example local network of FIG. 1.
Figure 6:
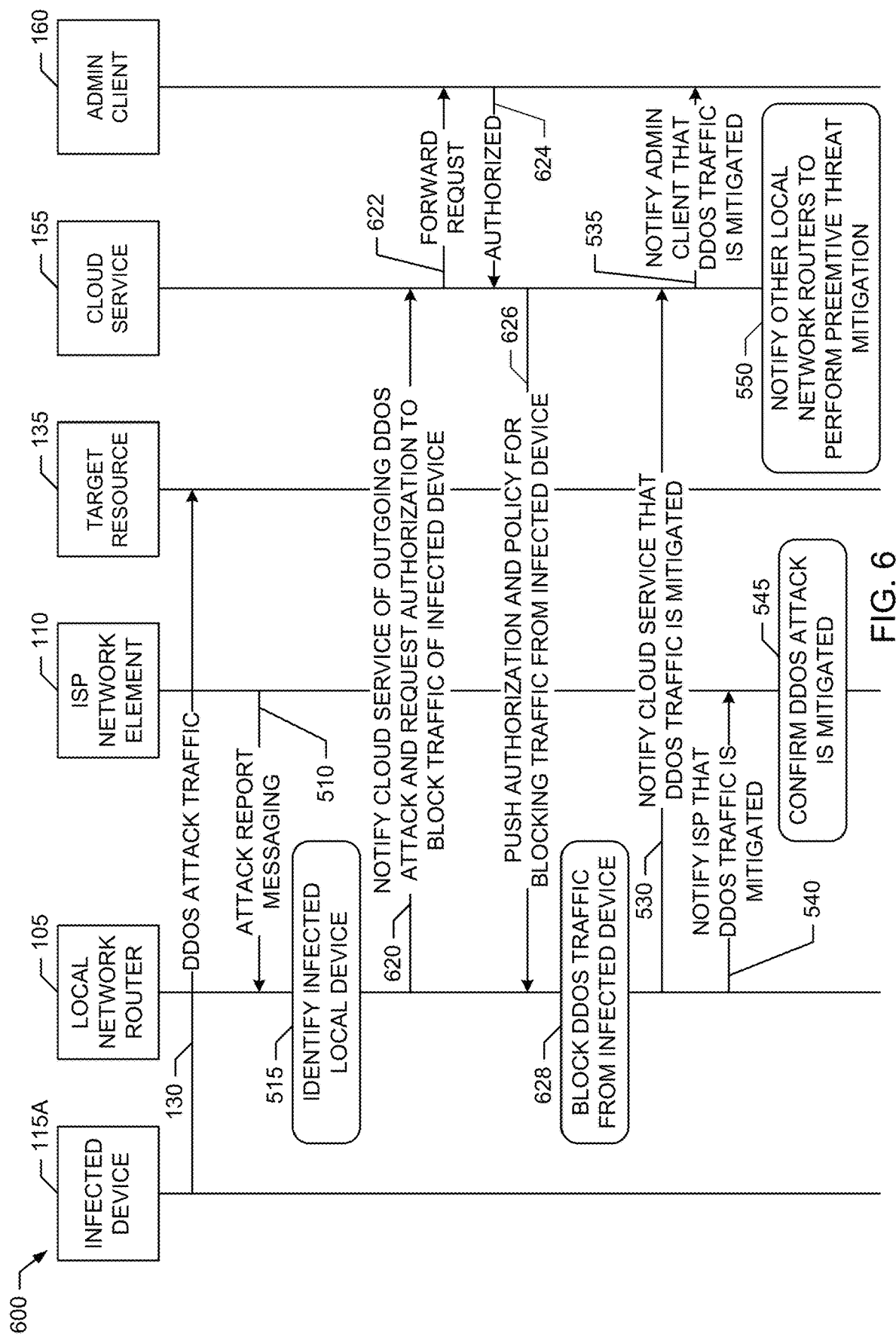
FIG. 6 is a message sequence diagram illustrating a second example sequence of operations performed by the example local network router and the example service provider network element of FIG. 1 to perform cooperative mitigation of a distributed denial of service attack originating in the example local network of FIG. 1.

Further implementation details concerning the example local router 105 and the example service provider network element 110 of FIGS. 2 and 3 are disclosed in connection with the example message sequence diagrams illustrated in FIGS. 4 to 6. FIG. 4 illustrates an example message sequence diagram 400 detailing implementation aspects associated with establishing the secure connection between the local router 105 and the network element 110 for exchanging information concerning detected DDoS attacks (e.g., the DDoS attack 130) originating in the local network 120. FIGS. 5 and 6 illustrate example message sequence diagrams 500 and 600, respectively, detailing implementation aspects of the local router 105 and the network element 110 associated with cooperative mitigation of a detected DDoS attack (e.g., the DDoS attack 130) originating in the local network 120.

In the illustrated examples of FIGS. 4 to 6, the threat signaling server 205 of the local router 105 and the threat signaling client 305 of the network element 110 are implemented by respective DOTS agents conforming with the DDoS Open Threat Signaling standards promulgated by the Internet Engineering Task Force (IETF)®. A DOTS agent is a DOTS-aware software and/or hardware module capable of participating in a DOTS signal or data channel. A DOTS agent can implement a DOTS client, DOTS server, a DOTS gateway, etc. As such, in the illustrated examples of FIGS. 4 and 5, the threat signaling server 205 of the local router 105 is implemented as a DOTS server, and the threat signaling client 305 of the network element 110 is implemented as a DOTS client. A DOTS client is a DOTS-aware software and/or hardware module responsible for requesting DDoS attack response coordination with other DOTS-aware elements. A DOTS server is a DOTS-aware software and/or hardware module responsible for handling and responding to messages from DOTS clients. The DOTS server enables DDoS attack mitigation on behalf of a requesting DOTS client by communicating the DOTS client's request to the DDoS attack mitigator and returning appropriate mitigation feedback to the requesting DOTS client. As disclosed in further detail below, the threat signaling server 205 of the local router 105 also emulates a threat signaling client (e.g., a DOTS client) and the threat signaling client 305 of the network element 110 also emulates a threat signal server (e.g., a DOTS server) when initiating the secure connection, and then revert back to their steady state roles after the secure connection is established.

The example message sequence diagram 400 of FIG. 4 illustrates an example procedure to initiate establishment of the secure connection between the local router 105 and the service provider network element 110. The message sequence diagram 400 of the illustrated example begins with the threat signaling server 205 of the local router 105 initially emulating or otherwise acting as a DOTS client (represented by block 405) and the threat signaling client 305 of the network element 110 initially emulating or otherwise acting as a DOTS server (represented by block 410). The threat signaling server 205 of the local router 105, which is emulating a DOTS client, transmits a request to the threat signaling client 305 of the network element 110, which is emulating a DOTS server, to establish a secure connection for exchanging DDoS threat signaling information (represented by message 415). For example, the secure connection can be a transport layer security (TLS) session, a datagram TLS session, etc., established to exchange DDoS threat signaling information between the network element 110 and the local router 105. After the secure connection is established (represented by message 420), the roles of the threat signaling server 205 of the local router 105 and the threat signaling client 305 of the network element 110 are reversed such that the threat signaling server 205 of the local router 105 reverts to implementing a DOTS server (represented by block 425) and the threat signaling client 305 of the network element 110 reverts to implementing a DOTS client (represented by block 430). Such role reversal causes the DOTS server implemented by the threat signaling server 205 of the local router 105 (which is behind NAT) to reachable by only the intended DOTS client in the ISP network, which is implemented the threat signaling client 305 of the network element 110. This helps prevent the DOTS server implemented by the threat signaling server 205 of the local router 105 from being subjected to other DDoS attacks itself.

After the role reversal is complete and the secure connection is established, the threat signaling server 205 of the local router 105 acts as a DOTS server to receive the DDoS attack details from the ISP network 125, and the threat signaling client 305 of the network element 110 acts as a DOTS client to provide such details to the local network 120 (represented by block 435). Likewise, the threat signaling server 205 of the local router 105 acts as a DOTS server to provide notifications to the ISP network 125 concerning mitigation of detected DDoS attacks, which are received by the threat signaling client 305 of the network element 110 acting as a DOTS client (represented by block 440).

The example message sequence diagram 500 of FIG. 5 illustrates a first example procedure for cooperative mitigation of a detected DDoS attack (e.g., the DDoS attack 130) originating in the local network 120. The message sequence diagram 500 of the illustrated example begins with the infected or otherwise compromised device 115A in the local network 120 originating the DDoS attack 130 towards the target computing resource 135. In the illustrated example, the ISP detects the outbound DDoS attack 130. For example, the DDoS detector 310 of the service provider network element 110 detects the outbound DDoS attack 130 using one or more deep packet inspection and/or other DDoS detection techniques, and/or receives filtering rules from an upstream service provider. For example, the DDoS detector 310 of the network element 110 may receive the filtering rules for detected DDoS-related traffic via border gateway protocol (BGP) FlowSpec signaling.

In response to detecting the outbound DDoS attack 130, the threat signaling client 305 of the network element 110, which is acting as a DOTS client in the ISP network 125, conveys information including the DDoS attack details to the threat signaling server 205 of the local router 105, which is acting as a DOTS server in the local network 120 (represented by line 510). In the illustrated example, the DDoS attack details conveyed by the threat signaling client 305 of the network element 110 to the threat signaling server 205 of the local router 105 include:

(i) a data tuple (e.g., 5-tuple) specifying the source and destination IP addresses associated with the detected DDoS attack 130, the source and destination ports associated with the detected DDoS attack 130, and the layer 4 (L4) protocol associated with the detected DDoS attack 130;

(ii) a start time associated with the data tuple (e.g., 5-tuple) (or, more generally, a start time associated with detection of the DDoS attack 130);

(iii) an identification of the target computing resource 135 that is under attack (e.g., represented as target IP prefixes and/or addresses, domains, a uniform resource identifier (URI), etc.);

(iv) an indication of whether the DDoS attack was detected by the ISP via execution of one or more DDoS detection techniques or via filtering rules provided by an upstream service provider;

(v) a type of the detected DDoS attack 130 (e.g., such as TLS re-negotiation, Slowloris, etc., which may be represented according to a common event formula definition); and (vi) baseline and attack traffic volumes (e.g., which can be represented in packets per second, bytes per second, bits per second, etc.).

In some examples, the source IP address and the source port specified in the data tuple described above are a public source IP address and a public source port. This is because the local network 120 may employ NAT or double NAT (e.g., such as NAT444, carrier grade NAT (CGN)), etc.). Also, in some examples, the DDoS attack details conveyed by the threat signaling client 305 of the network element 110 to the threat signaling server 205 of the local router 105 may include a subset of the DDoS attack details described above and/or other details concerning the DDoS attack.

In the illustrated example, the threat signaling server 205 of the local router 105, which implements the DOTS server in the local network 120, uses the received data tuple details, and the start time information in some examples, to identify the infected device 115A (represented by block 515). For example, the threat signaling server 205 of the local router 105 may use the received data tuple details (and the start time information in some examples) to find (e.g., look-up) the private (e.g., pre-NAT) source IP address of the infected device 115A in the address translation table 220 of the local router 105, in NAT flow logs maintained by local router 105, etc. In some examples, the threat signaling server 205 of the local router 105, which implements the DOTS server in the local network 120, performs address resolution protocol (ARP) cache lookup using the private (e.g., pre-NAT) source IP address of the infected device 115A found using the received data tuple (and start time) information as input to find the medium access control (MAC) address of the infected device 115A.

In the illustrated example, the threat signaling server 205 of the local router 105 also conveys the DDoS attack details received from the ISP network to the router management cloud service 155 (represented by line 520).

In the illustrated example, the DDoS mitigator 210 of the local router 105 uses the type of DDoS attack included in the information received from the ISP network to determine if the local router 105 has the ability to detect and mitigate the outgoing DDoS attack 130. In the illustrated example of FIG. 5, the DDoS mitigator 210 determines the local router 105 does have the ability to detect and mitigate the outgoing DDoS attack 130. As such, the DDoS mitigator 210 configures the local router 105 to re-direct packet processing of the network traffic being exchanged with the infected device 115A from a fast path (e.g., with minimal if any packet inspection) to a slow path (e.g., implemented in a kernel of the local router 105) to permit further, detailed packet inspection. The local router 105 inspects the re-directed slow path traffic to detect the outgoing DDoS attack 130, blocks the attack traffic and may quarantine the infected device 115A (e.g., by blocking all of its traffic using MAC level filtering) until the infected device 115A is remediated (represented by block 515). The threat signaling server 205 of the local router 105 then notifies the administrator of the local network 120 (e.g., a home user) that the DDoS attack 130 originating from the infected device 125 has been mitigated by sending an appropriate notification to the administrative client 160 (e.g., which may be an app installed on the administrator's mobile device) via the router management cloud service 155 (represented by lines 530 and 535).

In the illustrated example, the threat signaling server 205 of the local router 105, which is implementing the DOTS server in the local network 120, informs the threat signaling client 305 of the network element 110, which is implementing the DOTS client in the ISP network 125, that the DDoS attack traffic has been mitigated (e.g., blocked) (represented by line 540). In some examples, the ISP network 125 (e.g., via the DDoS detector 310 of the network element 110) confirms that the DDoS attack has indeed been mitigated (represented by block 545). As such, the ISP and upstream service providers do not have to penalize (e.g., block or rate-limit) all the outgoing traffic from the local network 120.

In the illustrated example, the router management cloud service 155 uses the DDoS attack details reported by the threat signaling server 205 of the local router 105 (see line 520) to perform preemptive mitigation of DDoS attacks associated with other devices like the infected device 115A (represented by block 550). For example, the cloud service 155 uses the reported DDoS attack details (see line 520) to identify the device type (e.g., name, make and model) of the infected device 115A, and then looks up the same type of IoT devices in other local networks managed by the cloud service 155. The cloud service 155 conveys the possibility of a DDoS attack being launched from those same type of IoT devices to the local routers associated with those local networks. The local routers, in-turn, re-direct the network traffic being exchanged with those IoT devices to a slow path (e.g., implemented in the kernel of the local routers) to permit further, detailed inspection. The local routers then inspect the network traffic via the slow path to detect any outgoing DDoS attacks, block the DDoS attack traffic, quarantine the devices or block their traffic until the infected devices are remediated, and notify the respective local network administrators about the infected devices in their networks using the cloud service 155 and associated administrator clients. Such preemptive mitigation can be especially beneficial for DDoS attacks (e.g., such as the Mirth attack) in which the infected devices are mostly the same type of IoT device (e.g., webcams and DVRs in the case of the Miraj attack).

The example message sequence diagram 600 of FIG. 6 illustrates a second example procedure for cooperative mitigation of a detected DDoS attack (e.g., the DDoS attack 130) originating in the local network 120. The example message sequence diagram 600 of FIG. 6 includes many elements in common with the example message sequence diagram 500 of FIG. 5. As such, like elements in FIGS. 5 and 6 are labeled with the same reference numerals. The detailed descriptions of these like elements are provided above in connection with the discussion of FIG. 5 and, in the interest of brevity, are not repeated in the discussion of FIG. 6.

However, in the example procedure illustrated by the message sequence diagram 600 of FIG. 6, after receiving the information from the ISP network conveying the details of the detected DDOS attack 130, the DDoS mitigator 210 of the local router 105 determines the local router 105 does not have the ability to detect and mitigate the outgoing DDoS attack 130. Accordingly, in the illustrated example message sequence diagram 600, after identifying the infected device 115A based on the received DDoS attack details (see block 515), the DDoS mitigator 210 of the local router 105 notifies the administrator of the local network 120 (e.g., a home user) that the ISP or an upstream service provider has reported the DDoS attack 130 originating from the identified infected device 115A and requests authorization to restrict the network traffic being sent from identified infected device 115A to the target resource 135 under attack (represented by lines 620 and 622). For example, the DDoS mitigator 210 may send an appropriate notification and request to the administrative client 160 (e.g., which may be an app installed on the administrator's mobile device) via the router management cloud service 155, as shown. The notification received by the cloud service 155 in the illustrated example also informs the cloud service that the local router 105 lacks the ability to detect this type of DDoS attack, which may prompt security vendors offering home security to develop new signatures and techniques to detect new DDoS attacks.

In the illustrated example of FIG. 6, the administrative client 160 authorizes mitigation of the DDoS attack associated with infected device 115A (represented by line 624). In response, the cloud service 155 forwards the authorization and any mitigation policy to the DDoS mitigator 210 of the local router 105 for blocking the traffic from the infected device 115A (represented by line 626). For example, the mitigation policy may specify whether all traffic from the infected device 115A is to be blocked, or only the traffic associated with the DDoS attack 130 is to be blocked. The DDoS mitigator 210 of the local router 105 then blocks the network traffic from the infected device 115A according to the received policy (represented by block 628). Operation then proceeds to element 530 and subsequent elements as described above in connection with FIG. 5.

Thus, in view of the foregoing disclosure, the example threat signaling server 205 of the example local router 105 implements means for identifying an infected device 115A, which is originating a DDoS attack in a local network 120, based on first information describing the detected DDoS attack that is received from a threat signaling client of an ISP (such as the example threat signaling client 305 of the example network element 110), and transmitting second information to notify the threat signaling client of the ISP when the network traffic associated with the detected DDoS attack has been mitigated. In some examples, to identify the infected device 115A, the example threat signaling server 205 of the example local router 105 implements means for accessing the example address mapping table 220 of the local router 105 to identify, based on a first public network address and an attack start time included in the information received from the ISP, a first private network address of the infected device 115A. In some such examples, the address mapping table 220 is stored in memory and private network addresses of devices connected to the local network 120 to respective public network address associated with the devices.

In view of the foregoing disclosure, the example DDoS mitigator 210 of the example local router 105 implements means for mitigating the DDoS attack detected by the ISP and associated with network traffic originating from the infected device 115A connected to the local network 120. In some examples, to mitigate the detected DDoS attack, the example DDoS mitigator 210 of the example local router 105 implements means for performing deep packet inspection of the network traffic originating from the infected device 115A to confirm whether the network traffic is associated with the detected DDoS attack, where the deep packet inspection is based on attack characteristics included in the first information received from the ISP, and blocking the network traffic originating from the infected device 115A in response to the network traffic being confirmed by the deep packet inspection as being associated with the detected DDoS attack. In some examples, to mitigate the detected DDoS attack, the example DDoS mitigator 210 of the example local router 105 implements means for transmitting a request to the example administrative client 160 for authorization to block the network traffic originating from the infected device 115A, and blocking the network traffic originating from the infected device 115A in response to receiving an authorization response from the administrative client 160.

In view of the foregoing disclosure, the example threat signaling server 205 of the example local router 105 implements means for emulating a second threat signaling client (e.g., a DDoS client) to transmit a request to the threat signaling client 305 of the ISP to establish a secure connection, accepting incoming messages conveying information describing DDoS attacks when the incoming messages are received from the threat signaling client 305 of the ISP, and blocking incoming messages conveying information describing DDoS attacks when the incoming messages are not received from the threat signaling client 305 of the ISP.

In view of the foregoing disclosure, the example threat signaling server 205 of the example local router 105 implements means for reporting third information to the example router management cloud service 155, with the third information describing the infected device 115A and details concerning the detected DDoS attack 130.

In view of the foregoing disclosure, the example threat signaling client 305 of the service provider network element 110 implements means for transmitting first information describing a detected DDoS attack to the example threat signaling server 205 of the example local network router 105 of the example local network 120, and for receiving second information from the threat signaling server 205 of the local network 120, with the second information providing a notification when network traffic associated with the detected DDoS attack has been mitigated.

In view of the foregoing disclosure, the example DDoS detector 310 of the service provider network element 110 implements means for detecting a DDoS attack associated with network traffic received by the ISP network 125 and originating from the infected device 115A connected to the local network 120. In some examples, the DDoS detector 310 of the network element 110 implements means for detected the DDoS attack based on filtering rules provided by an upstream service provider, a DDoS detection algorithm implemented by the DDoS detector 310, etc.

In view of the foregoing disclosure, the example threat signaling client 305 of the service provider network element 110 implements means emulating a second threat signaling server (e.g., a DTOS server) to receive a request from the threat signaling server 205 of the local network 120 to establish a secure connection, and switching from emulating the threat signaling server to operating as the threat signaling client 305 (e.g., a DOTS client), after receipt of the request, to transmit messages to the threat signaling server 205 of the local network 120 conveying information describing detected DDoS attacks and to receive corresponding notifications from the threat signaling server 205 of the local network 120 concerning the DDoS attacks.

While example manners of implementing the example local router 105 and the example service provider network element 110 have been illustrated in FIGS. 1-6, one or more of the elements, processes and/or devices illustrated in FIGS. 1-5 may be combined, divided, re-arranged, omitted, eliminated and/or implemented in any other way. Further, the example threat signaling server 205, the example DDoS mitigator 210, the example NAT processor 215, the example address translation table 220, the example threat signaling client 305, the example DDoS detector 310 and/or, more generally, the example local router 105 and/or the example service provider network element 110 may be implemented by hardware, software, firmware and/or any combination of hardware, software and/or firmware. Thus, for example, any of the example threat signaling server 205, the example DDoS mitigator 210, the example NAT processor 215, the example address translation table 220, the example threat signaling client 305, the example DDoS detector 310 and/or, more generally, the example local router 105 and/or the example service provider network element 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example local router 105, the example service provider network element 110, the example threat signaling server 205, the example DDoS mitigator 210, the example NAT processor 215, the example address translation table 220, the example threat signaling client 305 and/or the example DDoS detector 310 is/are hereby expressly defined to include a non-transitory computer readable storage device or storage disk such as a memory, a digital versatile disk (DVD), a compact disk (CD), a Blu-ray disk, etc. including the software and/or firmware. Further still, the example local router 105 and/or the example service provider network element 110 may include one or more elements, processes and/or devices in addition to, or instead of, those illustrated in FIGS. 1-6, and/or may include more than one of any or all of the illustrated elements, processes and devices.

Figure 7:
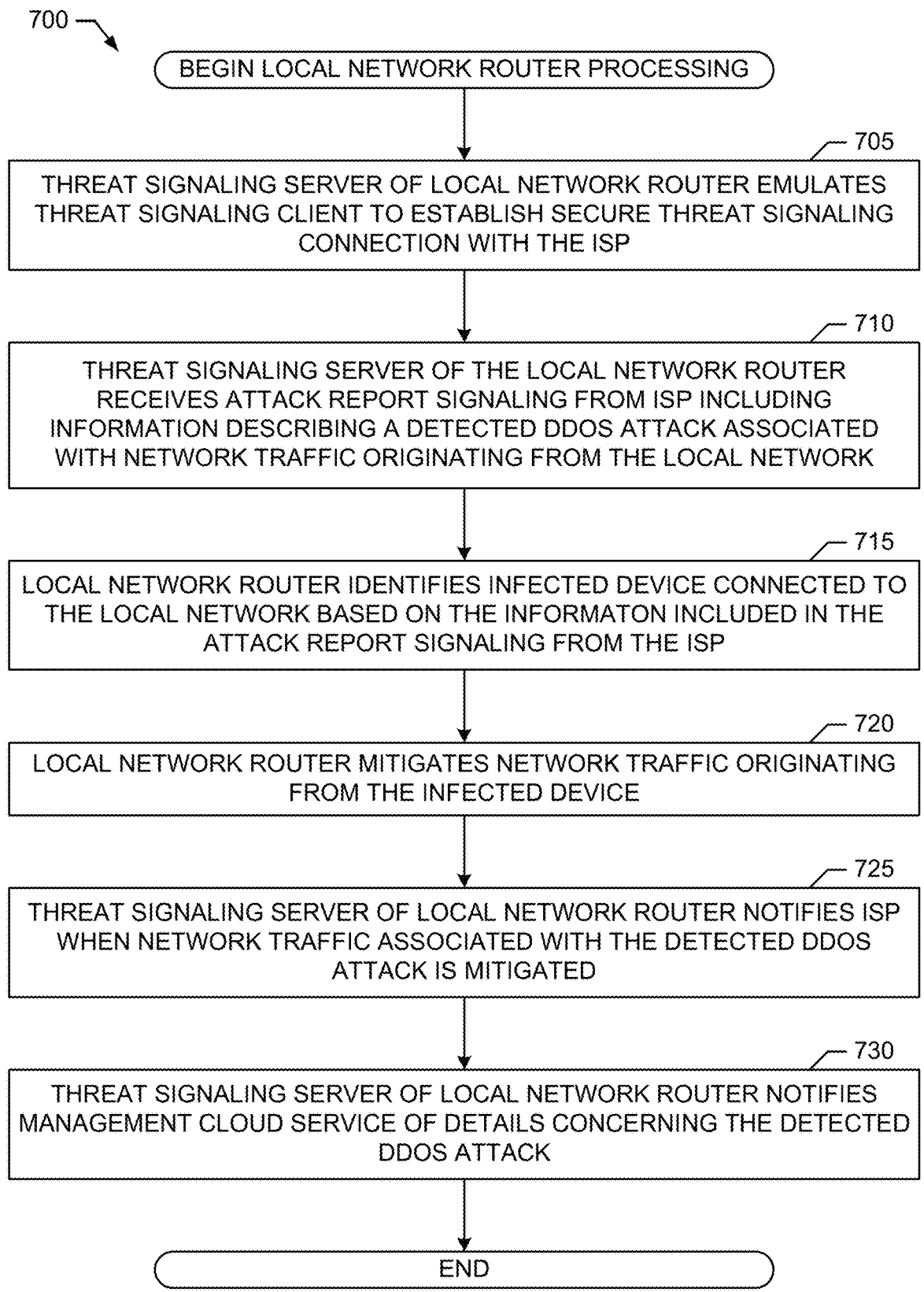
FIG. 7 is a flowchart representative of example computer readable instructions that may be executed to implement the example local network router of FIGS. 1, 2, 4, 5 and/or 6.
Figure 8:
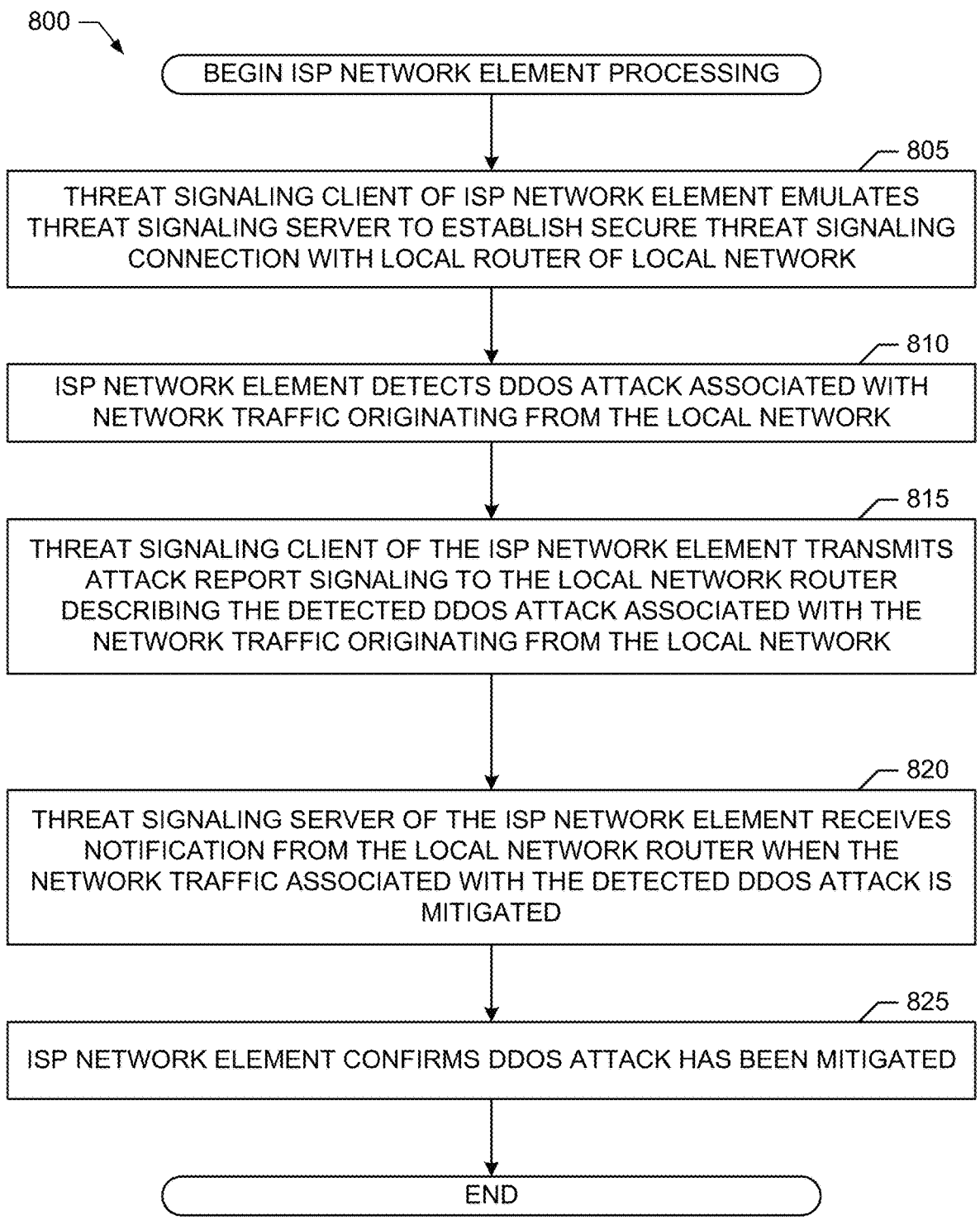
FIG. 8 is a flowchart representative of example computer readable instructions that may be executed to implement the example service provider network element of FIGS. 1, 3, 4, 5 and/or 6.

Flowcharts representative of example hardware logic, machine readable instructions, hardware implemented state machines, and/or any combination thereof for implementing the example local router 105 and the example service provider network element 110 are shown in FIGS. 7-8. In these examples, the machine readable instructions may be one or more executable programs or portion(s) thereof for execution by a computer processor, such as the processor 912 and/or the processor 1012 shown in the example processor platforms 900 and 1000 discussed below in connection with FIGS. 9 and 10. The one or more programs, or portion(s) thereof, may be embodied in software stored on a non-transitory computer readable storage medium such as a CD-ROM, a floppy disk, a hard drive, a DVD, a Blu-ray disk™, or a memory associated with the processor 912 and/or 1012, but the entire program or programs and/or parts thereof could alternatively be executed by a device other than the processor 912 and/or 1012, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 7-8, many other methods of implementing the example local router 105 and the example service provider network element 110 may alternatively be used. For example, with reference to the flowcharts illustrated in FIGS. 7-8, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, a Field Programmable Gate Array (FPGA), an ASIC, a comparator, an operational-amplifier (op-amp), a logic circuit, etc.) structured to perform the corresponding operation without executing software or firmware.

As mentioned above, the example processes of FIGS. 7-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

An example program 700 that may be executed to implement the example local router 105 of FIGS. 1-6 to implement cooperative mitigation of DDoS attacks originating in the example local network 120 is represented by the flowchart shown in FIG. 7. With reference to the preceding figures and associated written descriptions, the example program 700 of FIG. 7 begins execution at block 705 at which the example threat signaling server 205 of the local router 105 emulates a threat signaling client (e.g., a DOTS client) to establish a secure threat signaling connection with an ISP, as described above. At block 710, the threat signaling server 205 of the local router 105 receives DDoS attack report signaling from the ISP including information describing a detected DDoS attack associated with network traffic originating from the local network 120, as described above. At block 715, the threat signaling server 205 of the local router 105 identifies, as described above, the infected device (e.g., the device 115A) connected to the local network 120 using the attack report signaling information received from the ISP. At block 720, the example DDoS mitigator 210 of the local router 105 mitigates, as described above, the network traffic originating from the identified infected device. At block 725, the threat signaling server 205 of the local router 105 notifies the ISP when the network traffic associated with the detected DDoS attack has been mitigated, as described above. At block 730 the threat signaling server 205 of the local router 105 notifies the router management cloud service 155 of details concerning the detected DDoS attack, as described above.

An example program 800 that may be executed to implement the example service provider network element 110 of FIGS. 1-6 to implement cooperative mitigation of DDoS attacks originating in the example local network 120 is represented by the flowchart shown in FIG. 8. With reference to the preceding figures and associated written descriptions, the example program 800 of FIG. 8 begins execution at block 805 at which the example threat signaling client 305 of the network element 110 emulates a threat signaling server (e.g., a DOTS server) to establish a secure DDoS threat signaling connection with a local router (e.g., the local router 105) of a local network (e.g., the local network 120). At block 810, the example DDoS detector 310 of the network element 110 detects, as described above, a DDoS attack associated with network traffic originating from the local network. At block 815, the threat signaling client 305 of the network element 110 transmits attack report signaling to the local router that describes details concerning the detected DDoS attack associated with network traffic originating from the local network, as described above. At block 820, the threat signaling client 305 of the network element 110 receives a notification from the local router when the network traffic associated with the detected DDoS attack has been mitigated by the local router. At block 825, the DDoS detector 310 of the network element 110 confirms the DDoS attack has been mitigated, as described above.

Figure 9:
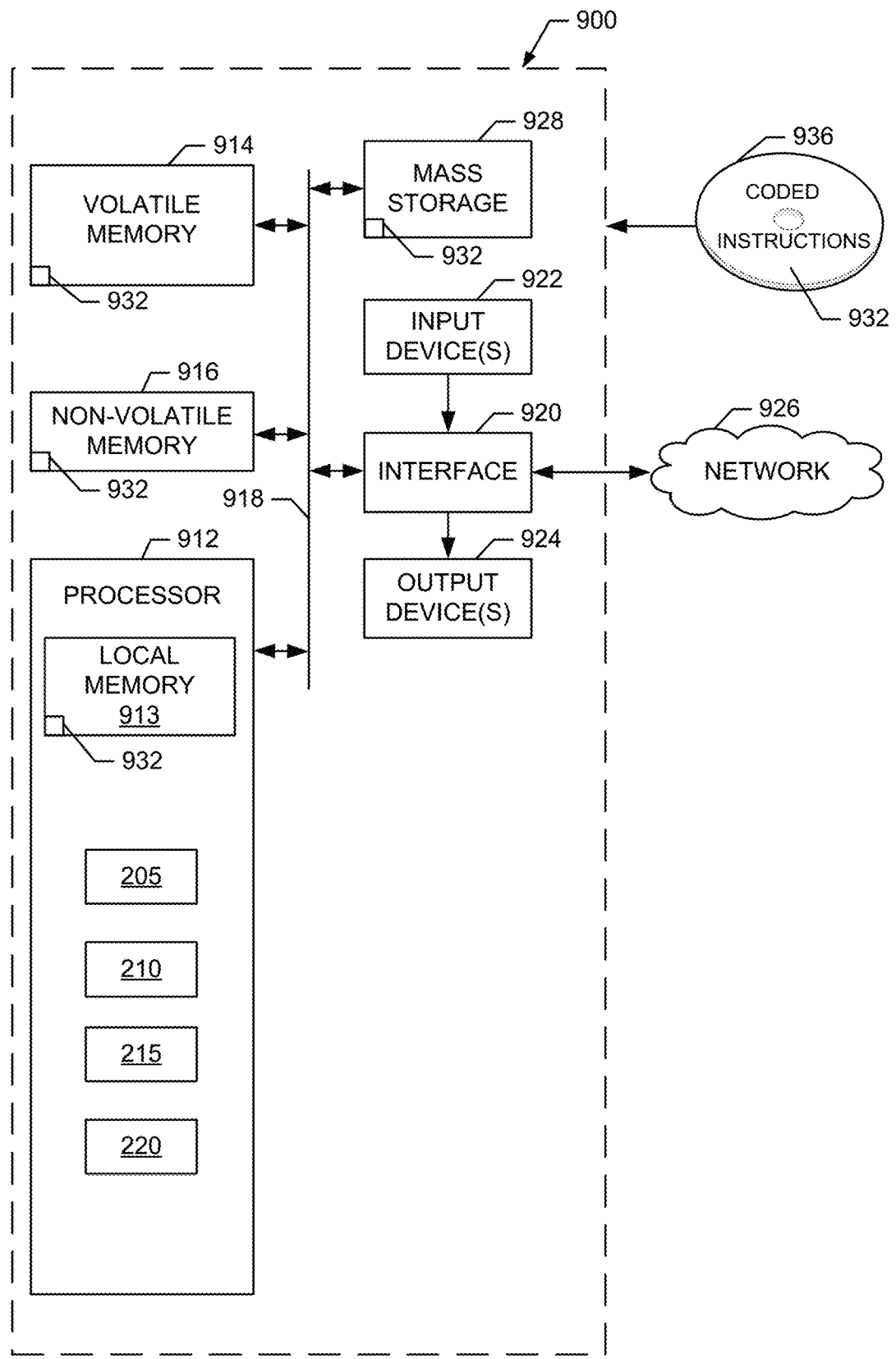
FIG. 9 is a block diagram of an example processor platform structured to execute the example computer readable instructions of FIG. 6 to implement the example local network router of FIGS. 1, 2, 4, 5 and/or 6.

FIG. 9 is a block diagram of an example processor platform 900 structured to execute the instructions of FIG. 7 to implement the example local router 105 of FIGS. 1-6. The processor platform 900 can be, for example, a server, a personal computer, a workstation, a mobile device (e.g., a cell phone, a smart phone, a tablet such as an iPad™), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor 912 may be a semiconductor based (e.g., silicon based) device. In this example, the processor 912 implements the example threat signaling server 205, the example DDoS mitigator 210, the example NAT processor 215 and the example address translation table 220.

The processor 912 of the illustrated example includes a local memory 913 (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, a keyboard, a button, a mouse, a touchscreen, a voice recognition system and/or any other human-machine interface.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL), connection, a telephone line connection, coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 corresponding to the instructions of FIG. 7 may be stored in the mass storage device 928, in the volatile memory 914, in the non-volatile memory 916, in the local memory 913 and/or on a removable non-transitory computer readable storage medium, such as a CD or DVD 936.

Figure 10:
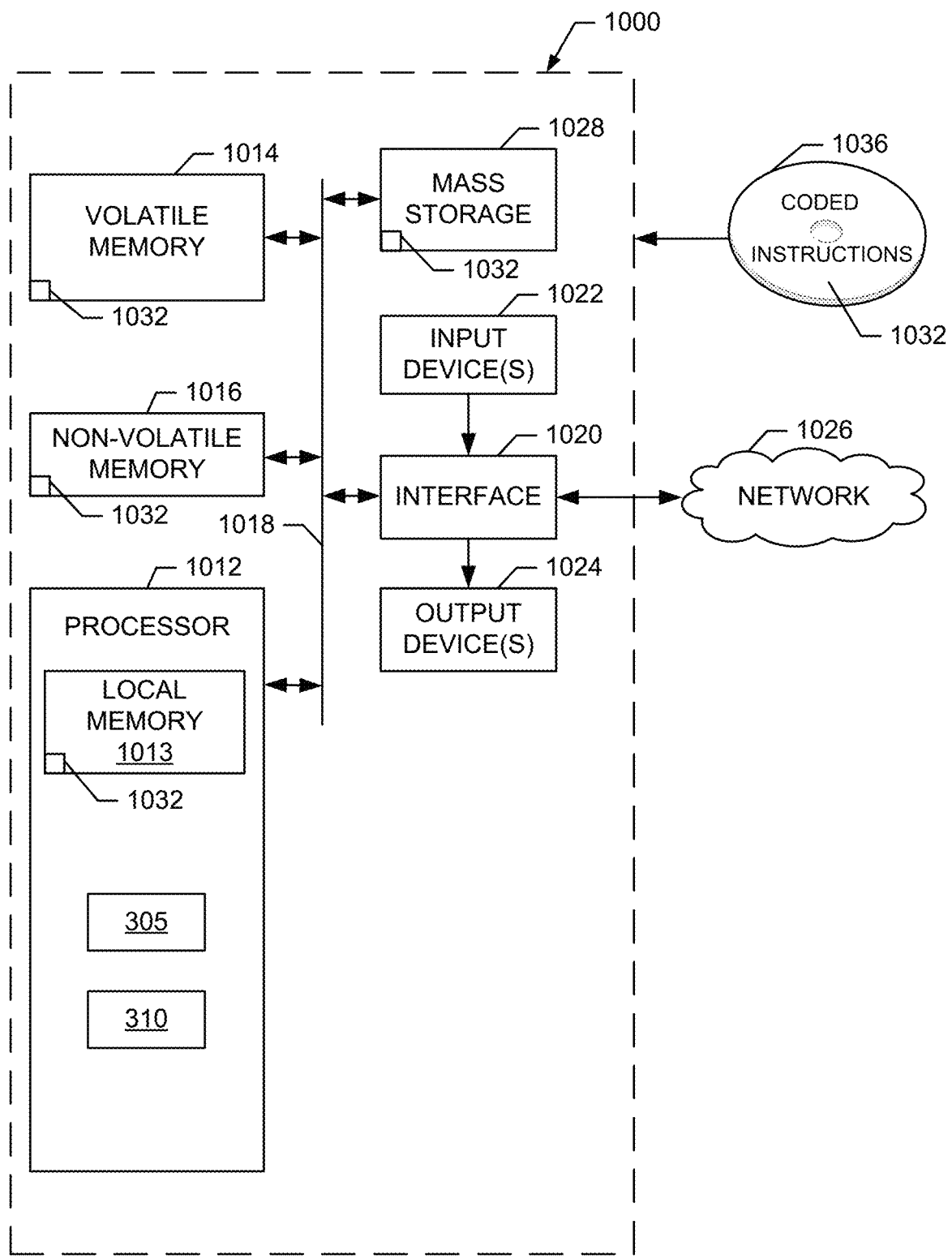
FIG. 10 is a block diagram of an example processor platform structured to execute the example computer readable instructions of FIG. 7 to implement the example service provider network element of FIGS. 1, 3, 4, 5 and/or 6.

FIG. 10 is a block diagram of an example processor platform 1000 structured to execute the instructions of FIG. 8 to implement the example service provider network element 110 of FIGS. 1-6. The processor platform 1000 can be, for example, a server, a personal computer, a workstation, a mobile device (e.g., a cell phone, a smart phone, a tablet such as an iPad™), an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The hardware processor 1012 may be a semiconductor based (e.g., silicon based) device. In this example, the processor 1012 implements the example threat signaling client 305 and the example DDoS detector 310.

The processor 1012 of the illustrated example includes a local memory 1013 (e.g., a cache). The processor 1012 of the illustrated example is in communication with a main memory including a volatile memory 1014 and a non-volatile memory 1016 via a link 1018. The link 1018 may be implemented by a bus, one or more point-to-point connections, etc., or a combination thereof. The volatile memory 1014 may be implemented by SDRAM, DRAM, RDRAM® and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a USB, a Bluetooth® interface, an NFC interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, a keyboard, a button, a mouse, a touchscreen, a voice recognition system and/or any other human-machine interface.

One or more output devices 1024 are also connected to the interface circuit 920 of the illustrated example. The output devices 1024 can be implemented, for example, by display devices (e.g., an LED, an OLED, an LCD, a CRT display, an IPS display, a touchscreen, etc.), a tactile output device, a printer and/or speakers(s). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a DSL connection, a telephone line connection, coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and DVD drives.

The machine executable instructions 1032 corresponding to the instructions of FIG. 8 may be stored in the mass storage device 1028, in the volatile memory 1014, in the non-volatile memory 1016, in the local memory 1013 and/or on a removable non-transitory computer readable storage medium, such as a CD or DVD 1036.

The foregoing disclosure provides examples of cooperative mitigation of distributed denial of service attacks originating in local networks. The following further examples, which include subject matter such as a local network router to perform cooperative mitigation of distributed denial of service attacks originating in a local network, a computer-readable storage medium including instructions that, when executed, cause one or more processors to a local network router to perform cooperative mitigation of distributed denial of service attacks originating in a local network, a network element to perform cooperative mitigation of distributed denial of service attacks associated with network traffic received by an Internet service provider network, a computer-readable storage medium including instructions that, when executed, cause one or more processors to a network element to perform cooperative mitigation of distributed denial of service attacks originating in a local network, and methods to perform cooperative mitigation of distributed denial of service attacks originating in a local network, are disclosed herein. The disclosed examples can be implemented individually and/or in one or more combinations.

Example 1 is a local network router to perform cooperative mitigation of distributed denial of service attacks originating in a local network. The local network router of example 1 includes a mitigator to mitigate a first distributed denial of service attack detected by an Internet service provider, the first distributed denial of service attack associated with network traffic originating from a first device connected to the local network. The local network router of example 1 also includes a threat signaling server to identify the first device based on first information received from a threat signaling client of the Internet service provider, the first information describing the first distributed denial of service attack, and transmit second information to notify the threat signaling client of the Internet service provider when the network traffic associated with the first distributed denial of service attack has been mitigated.

Example 2 includes the subject matter of example 1, wherein to mitigate the first distributed denial of service attack, the mitigator is to perform deep packet inspection of the network traffic originating from the first device to confirm whether the network traffic is associated with the first distributed denial of service attack, the deep packet inspection based on attack characteristics included in the first information, and block the network traffic originating from the first device in response to the network traffic being confirmed by the deep packet inspection as being associated with the first distributed denial of service attack.

Example 3 includes the subject matter of example 1, wherein to mitigate the first distributed denial of service attack, the mitigator is to transmit a request to an administrative client for authorization to block the network traffic originating from the first device, and block the network traffic originating from the first device in response to receiving an authorization response from the administrative client.

Example 4 includes the subject matter of any one of examples 1 to 3, and further includes memory to store an address mapping table to map private network addresses of devices connected to the local network to respective public network address associated with the devices. In example 4, the first information identifies a first public network address from which the network traffic associated with the first distributed denial of service attack originates and, to identify the first device, the threat signaling server is to access the address mapping table to identify, based on the first public network address and an attack start time included in the first information, a first private network address of the first device.

Example 5 includes the subject matter of any one of examples 1 to 4, wherein the threat signaling client of the Internet service provider is a first threat signaling client, and the threat signaling server is further to emulate a second threat signaling client, the second threat signaling client to transmit a request to the first threat signaling client of the Internet service provider to establish a secure connection, accept incoming messages conveying information describing distributed denial of service attacks when the incoming messages are received from the first threat signaling client of the Internet service provider, and block incoming messages conveying information describing distributed denial of service attacks when the incoming messages are not received from the first threat signaling client of the Internet service provider.

Example 6 includes the subject matter of example 5, wherein the threat signaling server is a first threat signaling server, the first threat signaling client of the Internet service provider is to emulate a second threat signaling server, and the request is to cause the first threat signaling client of the Internet service provider to switch from emulating the second threat signaling server to operating as the first threat signaling client relative to the first threat signaling server.

Example 7 includes the subject matter of any one of examples 1 to 6, wherein the threat signaling server is further to report third information to a cloud service, the third information describing the first device and the first distributed denial of service attack.

Example 8 is a non-transitory computer readable storage medium including computer readable instructions that, when executed, cause one or more processors of a local network router to at least: (i) identify, based on first information received from a threat signaling client of an Internet service provider, a first device originating network traffic associated with a first distributed denial of service attack detected by an Internet service provider, the first device connected to a local network, the first information describing the first distributed denial of service attack; (ii) mitigate the network traffic associated with the first distributed denial of service attack; and (iii) transmit second information to notify the threat signaling client of the Internet service provider when the first distributed denial of service attack has been mitigated.

Example 9 includes the subject matter of example 8, wherein to mitigate the network traffic associated with the first distributed denial of service attack, the computer readable instructions, when executed, cause the one or more processors to perform deep packet inspection of the network traffic originating from the first device to confirm whether the network traffic is associated with the first distributed denial of service attack, the deep packet inspection based on attack characteristics included in the first information, and block the network traffic originating from the first device in response to the network traffic being confirmed by the deep packet inspection as being associated with the first distributed denial of service attack.

Example 10 includes the subject matter of example 8, wherein to mitigate the network traffic associated with the first distributed denial of service attack, the computer readable instructions, when executed, cause the one or more processors to transmit a request to an administrative client for authorization to block the network traffic originating from the first device, and block the network traffic originating from the first device in response to receiving an authorization response from the administrative client.

Example 11 includes the subject matter of any one of examples 8 to 10, wherein the first information identifies a first public network address from which the network traffic associated with the first distributed denial of service attack originates and, to identify the first device, the computer readable instructions, when executed, cause the one or more processors to access an address mapping table to identify, based on the first public network address and an attack start time included in the first information, a first private network address of the first device, the address mapping table to map private network addresses of devices connected to the local network to respective public network address associated with the devices.

Example 12 includes the subject matter of any one of examples 8 to 11, wherein the threat signaling client of the Internet service provider is a first threat signaling client, and the computer readable instructions, when executed, further cause the one or more processors to emulate a second threat signaling client to transmit a request to the first threat signaling client of the Internet service provider to establish a secure connection, and switch from emulating the second threat signaling client to operating as a threat signaling server to: (i) accept incoming messages conveying information describing distributed denial of service attacks when the incoming messages are received from the first threat signaling client of the Internet service provider, and (ii) block incoming messages conveying information describing distributed denial of service attacks when the incoming messages are not received from the first threat signaling client of the Internet service provider.

Example 13 includes the subject matter of example 12, wherein the threat signaling server is a first threat signaling server, the first threat signaling client of the Internet service provider is to emulate a second threat signaling server, and the request is to cause the first threat signaling client of the Internet service provider to switch from emulating the second threat signaling server to operating as the first threat signaling client relative to the first threat signaling server.

Example 14 includes the subject matter of any one of examples 8 to 13, wherein the computer readable instructions, when executed, further cause the one or more processors to report third information to a cloud service, the third information describing the first device and the first distributed denial of service attack.

Example 15 is a method to perform cooperative mitigation of distributed denial of service attacks originating in a local network. The method of example 15 includes identifying, by executing an instruction with at least one processor of a local network router, a first device originating network traffic associated with a first distributed denial of service attack detected by an Internet service provider, the first device connected to the local network, the identifying of the first device based on first information received from a threat signaling client of the Internet service provider, the first information describing the first distributed denial of service attack. The method of example 15 also includes mitigating, by executing an instruction with the at least one processor, the network traffic associated with the first distributed denial of service attack. The method of example 15 further includes transmitting, by executing an instruction with the at least one processor, second information to notify the threat signaling client of the Internet service provider when the first distributed denial of service attack has been mitigated.

Example 16 includes the subject matter of example 15, wherein the mitigating of the network traffic associated with the first distributed denial of service attack includes performing deep packet inspection of the network traffic originating from the first device to confirm whether the network traffic is associated with the first distributed denial of service attack, the deep packet inspection based on attack characteristics included in the first information, and blocking the network traffic originating from the first device in response to the network traffic being confirmed by the deep packet inspection as being associated with the first distributed denial of service attack.

Example 17 includes the subject matter of example 15, wherein the mitigating of the network traffic associated with the first distributed denial of service attack includes transmitting a request to an administrative client for authorization to block the network traffic originating from the first device, and blocking the network traffic originating from the first device in response to receiving an authorization response from the administrative client.

Example 18 includes the subject matter of any one of examples 15 to 17, wherein the first information identifies a first public network address from which the network traffic associated with the first distributed denial of service attack originates and the identifying of the first device includes accessing an address mapping table to identify, based on the first public network address and an attack start time included in the first information, a first private network address of the first device, the address mapping table mapping private network addresses of devices connected to the local network to respective public network address associated with the devices.

Example 19 includes the subject matter of any one of examples 15 to 18, wherein the threat signaling client of the Internet service provider is a first threat signaling client, and further including emulating a second threat signaling client to transmit a request to the first threat signaling client of the Internet service provider to establish a secure connection, and switching from emulating the second threat signaling client to operating as a threat signaling server to: (i) accept incoming messages conveying information describing distributed denial of service attacks when the incoming messages are received from the first threat signaling client of the Internet service provider; and (ii) block incoming messages conveying information describing distributed denial of service attacks when the incoming messages are not received from the first threat signaling client of the Internet service provider.

Example 20 includes the subject matter of example 19, wherein the threat signaling server is a first threat signaling server, the first threat signaling client of the Internet service provider is to emulate a second threat signaling server, and the request is to cause the first threat signaling client of the Internet service provider to switch from emulating the second threat signaling server to operating as the first threat signaling client relative to the first threat signaling server.

Example 21 includes the subject matter of any one of examples 15 to 20, and further includes reporting third information to a cloud service, the third information describing the first device and the first distributed denial of service attack.

Example 22 is a network element to perform cooperative mitigation of distributed denial of service attacks associated with network traffic received by an Internet service provider network. The network element of example 22 includes a detector to detect a first distributed denial of service attack associated with first network traffic received by the Internet service provider network, the first network traffic originating from a first device connected to a local network. The network element of example 22 also includes a threat signaling client to transmit first information describing the first distributed denial of service attack to a threat signaling server implemented by a local network router of the local network, and receive second information from the threat signaling server of the local network, the second information to provide a notification when the first network traffic associated with the first distributed denial of service attack has been mitigated.

Example 23 includes the subject matter of example 22, wherein the detector is to detect the first distributed denial of service attack based on at least one of filtering rules provided by an upstream service provider or a distributed denial of service detection algorithm implemented by the detector.

Example 24 includes the subject matter of example 22 or example 23, wherein the first information includes a tuple to specify a source Internet protocol address associated with the first distributed denial of service attack, a destination Internet protocol address associated with the first distributed denial of service attack, a source port associated with the first distributed denial of service attack, a destination port associated with the first distributed denial of service attack, and a protocol type of the network traffic is associated with the first distributed denial of service attack.

Example 25 includes the subject matter of example 24, wherein the first information further includes attack characteristics associated with the first distributed denial of service attack. The attack characteristics of example 25 include an attack start time, an attack type, an identifier of a resource under attack, and a traffic volume associated with the attack.

Example 26 includes the subject matter of any one of examples 22 to 25, wherein the threat signaling server of the local network is a first threat signaling server, and the threat signaling client is further to emulate a second threat signaling server, the second threat signaling server to receive a request from the first threat signaling server of the local network to establish a secure connection, and switch from emulating the second threat signaling server to operating as the threat signaling client, after receipt of the request, to transmit messages to the first threat signaling server of the local network conveying information describing distributed denial of service attacks and to receive corresponding notifications from the first threat signaling server of the local network concerning the distributed denial of service attacks.

Example 27 includes the subject matter of example 26, wherein the threat signaling client is a first threat signaling client, the first threat signaling server of the local network is to emulate a second threat signaling client, and after the request is received, the first threat signaling server of the local network is to switch from emulating the second threat signaling client to operating as the first threat signaling server relative to the first threat signaling client.

Example 28 is a non-transitory computer readable storage medium including computer readable instructions that, when executed, cause one or more processors of a network element to at least: (i) detect a first distributed denial of service attack associated with first network traffic received by an Internet service provider network, the first network traffic originating from a first device connected to a local network, (ii) transmit first information describing the first distributed denial of service attack to a threat signaling server implemented by a local network router of the local network, and (iii) receive second information from the threat signaling server of the local network, the second information to provide a notification when the first network traffic associated with the first distributed denial of service attack has been mitigated.

Example 29 includes the subject matter of example 28, wherein the computer readable instructions, when executed, cause the one or more processors to detect the first distributed denial of service attack based on at least one of filtering rules provided by an upstream service provider or execution of a distributed denial of service detection algorithm.

Example 30 includes the subject matter of example 28 or example 29, wherein the first information includes a tuple to specify a source Internet protocol address associated with the first distributed denial of service attack, a destination Internet protocol address associated with the first distributed denial of service attack, a source port associated with the first distributed denial of service attack, a destination port associated with the first distributed denial of service attack, and a protocol type of the network traffic is associated with the first distributed denial of service attack.

Example 31 includes the subject matter of example 30 wherein the first information further includes attack characteristics associated with the first distributed denial of service attack. The attack characteristics of example 31 include an attack start time, an attack type, an identifier of a resource under attack, and a traffic volume associated with the attack.

Example 32 includes the subject matter of any one of examples 28 to 31, wherein the threat signaling server of the local network is a first threat signaling server, and the computer readable instructions, when executed, further cause the one or more processors to emulate a second threat signaling server to receive a request from the first threat signaling server of the local network to establish a secure connection, and switch from emulating the second threat signaling server to operating as a threat signaling client, after receipt of the request, to transmit messages to the first threat signaling server of the local network conveying information describing distributed denial of service attacks and to receive corresponding notifications from the first threat signaling server of the local network concerning the distributed denial of service attacks.

Example 33 includes the subject matter of example 32, wherein the threat signaling client is a first threat signaling client, the first threat signaling server of the local network is to emulate a second threat signaling client, and after the request is received, the first threat signaling server of the local network is to switch from emulating the second threat signaling client to operating as the first threat signaling server relative to the first threat signaling client.

Example 34 is a method to perform cooperative mitigation of distributed denial of service attacks associated with network traffic received by an Internet service provider network. The method of example 34 includes detecting, by executing an instruction with at least one processor, a first distributed denial of service attack associated with first network traffic received by an Internet service provider network, the first network traffic originating from a first device connected to a local network. The method of example 34 also includes transmitting, by executing an instruction with the at least one processor, first information describing the first distributed denial of service attack to a threat signaling server implemented by a local network router of the local network. The method of example 34 further includes receiving, by executing an instruction with the at least one processor, second information from the threat signaling server of the local network, the second information to provide a notification when the first network traffic associated with the first distributed denial of service attack has been mitigated.

Example 35 includes the subject matter of example 34, wherein the detecting of the first distributed denial of service attack is based on at least one of filtering rules provided by an upstream service provider or execution of a distributed denial of service detection algorithm.

Example 36 includes the subject matter of example 34 or example 35, wherein the first information includes a tuple specifying a source Internet protocol address associated with the first distributed denial of service attack, a destination Internet protocol address associated with the first distributed denial of service attack, a source port associated with the first distributed denial of service attack, a destination port associated with the first distributed denial of service attack, and a protocol type of the network traffic is associated with the first distributed denial of service attack.

Example 37 includes the subject matter of example 36, wherein the first information further includes attack characteristics associated with the first distributed denial of service attack. The attack characteristics of example 37 include an attack start time, an attack type, an identifier of a resource under attack, and a traffic volume associated with the attack.

Example 38 includes the subject matter of any one of examples 34 to 37, wherein the threat signaling server of the local network is a first threat signaling server, and further including emulating a second threat signaling server to receive a request from the first threat signaling server of the local network to establish a secure connection, and switching from emulating the second threat signaling server to operating as a threat signaling client, after receipt of the request, to transmit messages to the first threat signaling server of the local network conveying information describing distributed denial of service attacks and to receive corresponding notifications from the first threat signaling server of the local network concerning the distributed denial of service attacks.

Example 39 includes the subject matter of example 38, wherein the threat signaling client is a first threat signaling client, the first threat signaling server of the local network is to emulate a second threat signaling client, and after the request is received, the first threat signaling server of the local network is to switch from emulating the second threat signaling client to operating as the first threat signaling server relative to the first threat signaling client.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

It is noted that this patent claims priority from Indian Provisional Patent Application Serial Number 201841031876, which was filed on Aug. 25, 2018, and is hereby incorporated by reference in its entirety.

What is claimed is:

1. A network element to perform cooperative mitigation of distributed denial of service attacks associated with network traffic received by an Internet service provider network, the network element comprising:
at least one memory;
computer readable instructions; and
at least one processor to execute the computer readable instructions to at least:
  detect a first distributed denial of service attack associated with first network traffic received by the Internet service provider network, the first network traffic originating from a first device connected to a local network; and
  implement a threat signaling client to:
    transmit first information describing the first distributed denial of service attack to a first threat signaling server implemented by a local network router of the local network;
    receive second information from the first threat signaling server of the local network, the second information to provide a notification when the first network traffic associated with the first distributed denial of service attack has been mitigated;
    prior to transmission of the first information, emulate a second threat signaling server, the second threat signaling server to receive a request from the first threat signaling server of the local network to establish a secure connection; and
    after receipt of the request, switch from emulating the second threat signaling server to operating as the threat signaling client to (i) transmit messages to the first threat signaling server of the local network conveying information describing distributed denial of service attacks and (ii) receive corresponding notifications from the first threat signaling server of the local network concerning the distributed denial of service attacks.

2. The network element of claim 1, wherein the at least one processor is to detect the first distributed denial of service attack based on at least one of filtering rules provided by an upstream service provider or a distributed denial of service detection algorithm implemented by the at least one processor.

3. The network element of claim 1, wherein the first information includes a tuple to specify:
a source Internet protocol address associated with the first distributed denial of service attack;
a destination Internet protocol address associated with the first distributed denial of service attack;
a source port associated with the first distributed denial of service attack;
a destination port associated with the first distributed denial of service attack; and
a protocol type of the first network traffic associated with the first distributed denial of service attack.

4. The network element of claim 3, wherein the first information further includes attack characteristics associated with the first distributed denial of service attack, the attack characteristics including:
an attack start time;
an attack type;
an identifier of a resource under attack; and
a traffic volume associated with the attack.

5. The network element of claim 1, wherein the threat signaling client is a first threat signaling client, the first threat signaling server of the local network is to emulate a second threat signaling client, and after the request is received, the first threat signaling server of the local network is to switch from emulating the second threat signaling client to operating as the first threat signaling server relative to the first threat signaling client.

6. A non-transitory computer readable storage medium comprising computer readable instructions that, when executed, cause one or more processors of a network element to at least:
detect a first distributed denial of service attack associated with first network traffic received by an Internet service provider network, the first network traffic originating from a first device connected to a local network;
transmit first information describing the first distributed denial of service attack to a first threat signaling server implemented by a local network router of the local network;
receive second information from the first threat signaling server of the local network, the second information to provide a notification when the first network traffic associated with the first distributed denial of service attack has been mitigated;

prior to transmission of the first information, emulate a second threat signaling server, the second threat signaling server to receive a request from the first threat signaling server of the local network to establish a secure connection; and after receipt of the request, switch from emulating the second threat signaling server to operating as a threat signaling client to (i) transmit messages to the first threat signaling server of the local network conveying information describing distributed denial of service attacks and (ii) receive corresponding notifications from the first threat signaling server of the local network concerning the distributed denial of service attacks.

7. The storage medium of claim 6, wherein the computer readable instructions, when executed, cause the one or more processors to detect the first distributed denial of service attack based on at least one of filtering rules provided by an upstream service provider or execution of a distributed denial of service detection algorithm.

8. The storage medium of claim 6, wherein the first information includes a tuple to specify:
   a source Internet protocol address associated with the first distributed denial of service attack;
   a destination Internet protocol address associated with the first distributed denial of service attack;
   a source port associated with the first distributed denial of service attack;
   a destination port associated with the first distributed denial of service attack; and
   a protocol type of the first network traffic associated with the first distributed denial of service attack.

9. The storage medium of claim 8, wherein the first information further includes attack characteristics associated with the first distributed denial of service attack, the attack characteristics including:
   an attack start time;
   an attack type;
   an identifier of a resource under attack; and
   a traffic volume associated with the attack.

10. The storage medium of claim 6, wherein the threat signaling client is a first threat signaling client, the first threat signaling server of the local network is to emulate a second threat signaling client, and after the request is received, the first threat signaling server of the local network is to switch from emulating the second threat signaling client to operating as the first threat signaling server relative to the first threat signaling client.

11. A method to perform cooperative mitigation of distributed denial of service attacks associated with network traffic received by an Internet service provider network, the method comprising:
   detecting, by executing an instruction with at least one processor, a first distributed denial of service attack associated with first network traffic received by an Internet service provider network, the first network traffic originating from a first device connected to a local network;
   transmitting, by executing an instruction with the at least one processor, first information describing the first distributed denial of service attack to a first threat signaling server implemented by a local network router of the local network;
   receiving, by executing an instruction with the at least one processor, second information from the first threat signaling server of the local network, the second information to provide a notification when the first network traffic associated with the first distributed denial of service attack has been mitigated;
   prior to transmitting the first information, emulating a second threat signaling server, the second threat signaling server to receive a request from the first threat signaling server of the local network to establish a secure connection; and
   after receiving the request, switching from emulating the second threat signaling server to operating as a threat signaling client to (i) transmit messages to the first threat signaling server of the local network conveying information describing distributed denial of service attacks and (ii) receive corresponding notifications from the first threat signaling server of the local network concerning the distributed denial of service attacks.

12. The method of claim 11, wherein the detecting of the first distributed denial of service attack is based on at least one of filtering rules provided by an upstream service provider or execution of a distributed denial of service detection algorithm.

13. The method of claim 11, wherein the first information includes a tuple specifying:
   a source Internet protocol address associated with the first distributed denial of service attack;
   a destination Internet protocol address associated with the first distributed denial of service attack;
   a source port associated with the first distributed denial of service attack;
   a destination port associated with the first distributed denial of service attack; and
   a protocol type the first network traffic associated with the first distributed denial of service attack.

14. The method of claim 13, wherein the first information further includes attack characteristics associated with the first distributed denial of service attack, the attack characteristics including:
   an attack start time;
   an attack type;
   an identifier of a resource under attack; and
   a traffic volume associated with the attack.

15. The method of claim 11, wherein the threat signaling client is a first threat signaling client, the first threat signaling server of the local network is to emulate a second threat signaling client, and after the request is received, the first threat signaling server of the local network is to switch from emulating the second threat signaling client to operating as the first threat signaling server relative to the first threat signaling client.

* * * * *